United States Patent
Granger-Brown et al.

(10) Patent No.: US 9,837,108 B2
(45) Date of Patent: Dec. 5, 2017

(54) MAGNETIC SENSOR AND A METHOD AND DEVICE FOR MAPPING THE MAGNETIC FIELD OR MAGNETIC FIELD SENSITIVITY OF A RECORDING HEAD

(75) Inventors: Nicholas J. Granger-Brown, Waterlooville (GB); Graham R. Eveleigh, Rake (GB); Michael P. Cooke, Hook (GB)

(73) Assignee: Seagate Technology LLC, Cupertino, CA (US)

( * ) Notice: Subject to any disclaimer, the term of this patent is extended or adjusted under 35 U.S.C. 154(b) by 1327 days.

(21) Appl. No.: 13/468,413

(22) Filed: May 10, 2012

(65) Prior Publication Data

US 2012/0268112 A1    Oct. 25, 2012

Related U.S. Application Data

(63) Continuation-in-part of application No. 13/296,850, filed on Nov. 15, 2011, now abandoned.

(60) Provisional application No. 61/415,223, filed on Nov. 18, 2010.

(51) Int. Cl.
   *G11B 5/455*    (2006.01)

(52) U.S. Cl.
   CPC ......... *G11B 5/455* (2013.01); *Y10T 29/49004* (2015.01)

(58) Field of Classification Search
   CPC ............................................ G11B 2005/0016
   USPC .......... 324/210, 225, 211, 212, 263; 360/31, 360/110, 122, 128, 123.02, 125.16, 360/327.33
   See application file for complete search history.

(56) References Cited

U.S. PATENT DOCUMENTS

| | | | |
|---|---|---|---|
| 4,414,554 A | | 11/1983 | Springer |
| 4,605,977 A | * | 8/1986 | Matthews ................ G11B 5/58 360/234.7 |
| 4,639,806 A | * | 1/1987 | Kira ..................... G11B 5/3903 324/252 |
| 4,907,113 A | * | 3/1990 | Mallary .............. G11B 5/1278 360/112 |
| 4,967,298 A | * | 10/1990 | Mowry .................. G01R 33/09 360/121 |

(Continued)

FOREIGN PATENT DOCUMENTS

| | | |
|---|---|---|
| EP | 0 376 459 | 7/1990 |
| JP | 2010-092532 | 4/2010 |

OTHER PUBLICATIONS

I. A. Mahmood et al., "Fast spiral-scan atomic force microscopy," Nanotechnology, vol. 20, pp. 1-4 (2009).

(Continued)

*Primary Examiner* — Jermele M Hollington
*Assistant Examiner* — Christopher McAndrew
(74) *Attorney, Agent, or Firm* — Faegre Baker Daniels LLP

(57) ABSTRACT

The invention provides a method and apparatus for scanning a read/write head of a hard disk drive during manufacture. The method comprises: providing a magnetic sensor; moving the magnetic sensor relative to and in close proximity to the read/write head under test; obtaining measurements from the head under test or the sensor, representing a two-dimensional magnetic map; processing the map to obtain an accurate map of the head sensitivity of the head under test from which the key performance characteristics of the head can be obtained.

16 Claims, 17 Drawing Sheets

(56) References Cited

U.S. PATENT DOCUMENTS

| | | | | |
|---|---|---|---|---|
| 5,075,956 | A * | 12/1991 | Das | G11B 5/11 29/603.14 |
| 5,103,553 | A * | 4/1992 | Mallary | G11B 5/1278 29/603.13 |
| 5,111,352 | A * | 5/1992 | Das | G11B 5/127 360/125.39 |
| 5,189,578 | A * | 2/1993 | Mori | G11B 5/5552 360/246.6 |
| 5,434,733 | A * | 7/1995 | Hesterman | G11B 5/245 360/121 |
| 5,539,598 | A * | 7/1996 | Denison | G11B 5/11 360/121 |
| 5,567,404 | A | 10/1996 | Lee et al. | |
| 5,567,484 | A | 10/1996 | Baumgart et al. | |
| 6,388,229 | B1 | 5/2002 | Baumgart et al. | |
| 6,657,431 | B2 | 12/2003 | Xiao | |
| 6,667,848 | B1 * | 12/2003 | Khizroev | G11B 5/00 360/123.02 |
| 6,700,368 | B2 * | 3/2004 | Takano | G06F 17/5018 324/210 |
| 6,807,027 | B2 * | 10/2004 | McGeehin | G11B 5/1278 360/119.02 |
| 7,023,204 | B2 | 4/2006 | Nikitin et al. | |
| 7,124,654 | B1 * | 10/2006 | Davies | G11B 5/455 324/210 |
| 7,126,788 | B1 * | 10/2006 | Liu | G11B 5/1278 360/125.53 |
| 7,126,790 | B1 * | 10/2006 | Liu | G11B 5/1278 360/125.53 |
| 7,382,575 | B2 * | 6/2008 | Amin | G11B 5/1274 360/125.16 |
| 7,852,072 | B2 * | 12/2010 | Araki | G11B 5/455 324/210 |
| 2001/0030536 | A1 | 10/2001 | Abe | |
| 2002/0012186 | A1 * | 1/2002 | Nakamura | G11B 5/004 360/52 |
| 2002/0071208 | A1 | 6/2002 | Batra et al. | |
| 2003/0042896 | A1 | 3/2003 | Abe | |
| 2004/0095133 | A1 | 5/2004 | Nikitin et al. | |
| 2005/0105213 | A1 * | 5/2005 | Takeo | G11B 5/1278 360/125.21 |
| 2005/0128637 | A1 | 6/2005 | Johnston et al. | |
| 2005/0225897 | A1 * | 10/2005 | Liu | G11B 5/3106 360/125.32 |
| 2005/0276512 | A1 | 12/2005 | Atkinson et al. | |
| 2006/0066298 | A1 * | 3/2006 | Grinberg | G11B 5/455 324/210 |
| 2006/0262453 | A1 * | 11/2006 | Mochizuki | G11B 5/1278 360/125.03 |
| 2007/0167731 | A1 * | 7/2007 | Taxt | G01R 33/5601 600/410 |
| 2007/0197911 | A1 | 8/2007 | Kaiser et al. | |
| 2009/0147410 | A1 | 6/2009 | Jiang et al. | |
| 2009/0310244 | A1 * | 12/2009 | Shimazawa | G11B 5/314 360/75 |
| 2010/0061002 | A1 | 3/2010 | Nakagomi et al. | |
| 2010/0170017 | A1 | 7/2010 | Heidmann | |

OTHER PUBLICATIONS

Joseph Pichon et al., "Estimate of Media Temperature in HAMR," Fall 2009 Technical Review, Carnegie Mellon University, pp. 14-19 (Sep. 17, 2009).

A. Moser et al., "Dynamic coercivity measurements in thin film recording media using a contact write/read tester," Journal of Applied Physics, vol. 85, No. 9, pp. 5018-5020 (Apr. 15, 1999).

S. Y. Yamamoto et al., "Scanning Magnetoresistance Microscopy (SMRM) as a Diagnostic for High Density Recording," IEEE Transactions on Magnetics, vol. 33, No. 1, pp. 891-896 (Jan. 1997).

Gavin N. Phillips et al., "Performance of Focused Ion Beam Trimmed Yoke-Type Magnetoresistive Heads for Magnetic Microscopy," IEEE Transactions on Magnetics, vol. 38, No. 5, pp. 3528-3535 (Sep. 2002).

Juergen Heidmann et al., "Recording Head Characterization Using a Narrow Domain Wall in Epitaxial Garnet Films," IEEE Transactions on Magnetics, vol. 45, No. 10, pp. 3652-3655 (Oct. 2009).

United Kingdom Intellectual Property Office Search Report dated Feb. 9, 2012 in corresponding Great Britain Patent Application No. GB1118994.1.

James G. Nagy et al., "Iterative Image Restoration Using Approximate Inverse Preconditioning," IEEE Transactions on Image Processing, vol. 5, No. 7, pp. 1151-1162 (Jul. 1996).

Nissim Amos et al., "Ultrahigh Coercivity Magnetic Force Microscopy Probes to Analyze High-Moment Magnetic Structures and Devices," IEEE Magnetics Letters, vol. 1, 4 pages (2010).

D.A. Fish et al., "Blind deconvolution by means of the Richardson-Lucy algorithm," J. Opt. Soc. Am. A, vol. 12, No. 1, pp. 58-65 and 9 pages of images (Jan. 1995).

Great Britain Office Action dated Sep. 11, 2012 in corresponding Great Britain Patent Application No. GB1208220.0.

Kazuyuki Ise et al., "New Shielded Single-Pole Head With Planar Structure," IEEE Transactions on Magnetics, vol. 42, 10, pp. 2422-2424 (Oct. 2006).

* cited by examiner

MAGNETIC SENSOR AND A METHOD AND DEVICE FOR MAPPING THE MAGNETIC FIELD OR MAGNETIC FIELD SENSITIVITY OF A RECORDING HEAD

This application is a continuation-in-part application of co-pending U.S. patent application Ser. No. 13/296,850, entitled "A Method and Device for Mapping the Magnetic Field or Magnetic Field Sensitivity of a Recording Head", filed Nov. 15, 2011, which claims priority and benefit to U.S. Provisional Patent Application Ser. No. 61/415,223, entitled "A Method and Device for Mapping the Magnetic Field or Magnetic Field Sensitivity of a Recording Head", filed on Nov. 18, 2010. The contents of each of the foregoing applications is incorporated herein in its entirety by reference.

The present invention relates to a magnetic sensor and to a method and device for mapping the magnetic field or magnetic field sensitivity of a recording head. The recording head may be either a read or a write head. Typically, the recoding head is a magnetic recording head that can be controlled both to write and to read data to or from a magnetic storage medium.

A hard disk drive typically includes a storage medium together with a recording head for writing data to and/or reading data from the storage medium. The head typically operates by control of a magnetic field generated (in write mode) or sensed (in read mode) by the head. The magnetic field or magnetic field sensitivity of a recording head is an important factor in the quality of a data storage device such as a hard disk drive. Indeed, having an understanding and knowledge of the magnetic field generated by a write head (or the sensitivity of a read head to a magnetic field) is important so as to be able accurately to control and operate a hard disk drive whilst minimising read and/or write errors.

There are a number of known methods of measuring and characterising the read and write magnetic fields of a hard disk drive recording head. In some embodiments, a spin-stand is used to measure performance in key areas and in others an atomic force microscope or other fine probe is used to detect or "read" the magnetic field of the head on a small scale. Although these methods can work and provide a reasonable map of the magnetic field or magnetic field sensitivity of a recording head, they can be very slow. Accordingly they are expensive to use and can be impractical for use during manufacture of a disk drive when quick and efficient operation is required. Furthermore, these known methods are generally impractical for use with recording heads at the ROW/BAR level, i.e. when there are 40 to 50 heads together in one unit. Indeed, use of a spin stand relies on the recording heads being singular. This is a major disadvantage.

In the article entitled "Recording Head Characterisation Using A Narrow Domain Wall In Epitaxial Garnet Films" by J. Heidmann and A. Taratorin, published in IEEE Transactions on Magnetics, Vol. 45, Issue 10, October 2009, pages 3652 to 3655, there is disclosed a method for recording head characterisation that uses a domain wall in a ferromagnetic garnet film with high perpendicular anisotropy as a highly localised field source with nanometer extent. As explained, when the domain wall is moved cross track over the read sensor of a perpendicular recording head, the spatial response function of the sensor is measured.

From the response curve, the magnetic read width of the sensor can be calculated and details of the response can reveal local sensor instabilities. By oscillating the domain wall at a frequency of a few megahertz, the method can also be applied to write-head testing when the write pole is subjected to the field from the oscillating domain wall and the induced voltage in the write coil is measured. However this is an expensive and time-consuming process which is not suited for use in high volume manufacturing processes.

In the article entitled "Iterative Image Restoration Using Approximate Inverse Preconditioning" by Nagy et al published in IEEE Transactions on Image Processing, Vol. 5, No. 7, Pages 1151 to 1162, July 1996, there is disclosed a method by which a linear shift-variant blur is removed from a signal or image by inverse or Wiener filtering or by use of an iterative least-squares de-blurring procedure. The method disclosed concerns solving de-convolution problems for atmospherically blurred images by the preconditioned conjugate gradient algorithm, where a new approximate inverse preconditioner is used to increase the rate of convergence.

Other known methods for imaging read and write heads are disclosed in US-A-2007/0197911 (Kaiser), US-A-2005/0276512 (Atkinson), U.S. Pat. No. 6,388,229, U.S. Pat. No. 6,657,431, U.S. Pat. No. 7,023,204 and the article entitled Ultrahigh Coercivity Magnetic Force Microscopy Probes to Analyze High-Moment by Amos, N., Frenandez, R., Ikkawi, R., Shachar, M., Hong, J., Lee, B., et al (2010) published in IEEE MAGNETICS LETTERS, 1, 6500104.

In Kaiser, there is disclosed a method for resolving features on a probe array that comprises acquiring a plurality of micro-shifted images of a region of a probe array, reconstructing an image of the probe array using the micro-shifted images; and deriving intensity values for one or more probe features disclosed on the probe array from the reconstructed image.

In Atkinson, there is disclosed a method and system for the selective use of de-convolution to reduce crosstalk between features of an image. Initially, areas of an image for de-convolution are selected. An image is provided comprising a plurality of features, wherein each feature is associated with at least one value (v). A test feature is identified with a high-value feature adjacent to a known low-value zone of the image. The method comprises the step of de-convolving the selected areas of the image.

In general then it can be understood that what is desired is a method and apparatus for mapping the magnetic field of a magnetic recording head that can work in a quick and efficient manner and is suitable for use in a test process during manufacture of a hard disk drive.

According to a first aspect of the present invention, there is provided a magnetic sensor for use in determining a map of the magnetic field or field sensitivity of a recording head for a hard disk drive, the sensor comprising: a magnetic pole; a planar magnetic shield, surrounding the pole and arranged in use to function as a return pole for a magnetic circuit formed with a recording head under test.

A magnetic sensor is provided which includes a planar shield surrounding the pole. Thus, in contrast to, for example, a conventional magnetic write or read head, the axis of operation of the device is turned through 90 degrees. In other words the pole is configured to direct magnetic flux in a direction perpendicular to the plane of the sensor. Comparing this to conventional arrangements, such as that described in US-A-2004/0095133, some significant advantages can be obtained.

First, since the direction of magnetic flux from the sensor is from the "flat" surface of the sensor, it is easy and convenient to use the sensor when scanning another device since the flat arrangement of the shield will enable easy, reliable and repeatable alignment of the sensor with a head under test.

Second, the arrangement of the pole surrounded by a large flat magnetic shield means that the shield can easily act as the return pole for a magnetic circuit. Due to the shield size, the sensor can receive the field (and complete the magnetic circuit) irrespective of the direction from which it originates. Thus, the sensor is flexible in that it can be used for mapping plural types of magnetic devices.

The shield preferably surrounds the pole entirely, i.e. so as to form an enclosed perimeter around the pole tip, however it is possible in some embodiments that there could be an opening or slot in the shield such that the perimeter is not closed. Such a shield would still be surrounding the pole tip.

In an embodiment, the length and width of the shield are between $10^2$ and $10^3$ times larger than the corresponding dimensions of the pole.

Preferably, the pole has a width of between 10 and 100 nm and the shield has a width of between 10 to 50 micrometers.

Preferably, the shield is a 2 dimensional shape, with the pole being positioned substantially centrally. By positioning the pole substantially centrally within the relatively large shield, this means that the sensor is, within the plane of the sensor, substantially omnidirectional.

Preferably, the shield is square and has sides of length between 10 and 100 micrometers. Thus, a relatively large shield is used. This increases the area for receiving magnetic flux and simplifies the completion of a magnetic circuit in use.

Preferably, the pole is configured so as to receive magnetic flux or direct generated magnetic flux in a direction perpendicular to the major plane of the shield.

Preferably, the sensor has plural poles within a single shield.

Preferably, the poles are uniformly distributed within a central area of the shield.

Preferably, the shield is formed of the same material as the pole and as a unitary component with the pole. The pole is preferably formed from the same material as the shield and can be formed using any known techniques. Using a unitary component means that the part count for the sensor is reduced as compared to a device where separate components are used. Furthermore the use of the same soft magnetic material ensures that the magnetic circuits are easily formed when the device is in use.

Preferably, at least the one of the pole and shield is formed of a soft magnetic material.

Preferably, the magnetic sensor comprises a protective overcoat so as to protect the pole and the shield. The use of a planar shield together with a protective overcoat provides for a robust and easy to use device.

Preferably, the magnetic sensor comprises a coil arranged within the shield to generate a magnetic field at the pole. By providing a coil within the sensor the sensor can be arranged to generate a magnetic field as well as to detect a magnetic field from an external source. Thus a common sensor can be used both to map both the field of a write head and the field sensitivity of a magnetic read head.

Preferably, the pole comprises a magneto resistive head responsive to a detected magnetic field to generate a corresponding electrical signal.

Preferably, the shape of the end surface of the pole is a regular polygon.

Preferably, the magnetic sensor comprises the shape of the end surface of the pole is an irregular polygon.

Preferably, the planar surface is treated to avoid sticking with a head under test.

Preferably, the treatment comprises one or more of the application of lubricant, the texturing and the use of a surface acoustic wave generator. The use of a planar shield together with some appropriate measure to stop sticking means that the sensor can be used safely and efficiently without risk of the sensor sticking to a device under test.

According to a second aspect of the present invention, there is provided a magnetic sensor for use in determining a map of the magnetic field or field sensitivity of a recording head for a hard disk drive, the sensor being substantially planar and comprising: a magnetic pole; a magnetic shield arranged in use to function as a return pole for a magnetic circuit formed with a recording head under test, wherein the pole is configured to direct magnetic flux in a direction perpendicular to the plane of the sensor.

According to a third aspect of the present invention, there is provided a method of determining a map of the magnetic field or field sensitivity of the recording head for a hard disk drive, the method comprising: providing a magnetic sensor; moving the magnetic sensor relative to and in close proximity to the recording head under test; obtaining measurements from the recording head under test or the sensor to produce a two-dimensional image representative of the recording head; processing the two-dimensional image to obtain a map of the magnetic field or field sensitivity of the recording head under test.

Thus, the invention provides a simple and robust way by which a magnetic field or magnetic field sensitivity of a magnetic recording head can be determined. The method is quick and efficient and preferably the determination of the map can be achieved in less than 10 s, thus making the method suitable for use during manufacture of a hard disk drive. As explained below, it will be appreciated, that the terms "sensor" and "recording head" as used herein will be construed appropriately such that the sensor itself can be thought of as a recording head and vice versa. It will also be appreciated that what is important is that there is relative movement between the sensor and the recording head such that a scan of the head can be made. The head can be kept stationary whilst the sensor is moved or vice versa. Indeed in some embodiments both the head and the sensor can be controlled to moved during a scan.

According to a fourth aspect of the present invention, there is provided a method of determining a map of the magnetic field or field sensitivity of a recording head for a hard disk drive, the method comprising: providing a magnetic sensor the sensor being substantially planar and comprising a pole configured to direct or receive flux in a direction substantially perpendicular to the plane of the sensor; moving the magnetic sensor and/or the recording head under test so that the magnetic sensor and the recording head move relative and in close proximity to each other; obtaining measurements from the recording head under test or the sensor to produce a two-dimensional image representative of the recording head magnetic field or field sensitivity; processing the two-dimensional image to obtain a map of the magnetic field or field sensitivity of the recording head under test.

In one embodiment, the method comprises processing the map to predict the key performance characteristics of the head. In other words, the map is used to enable key performance characteristics of the recording heard under test to be predicted.

In one embodiment, the head under test is a read head. In another embodiment, the head under test is a write head.

In one embodiment, the method comprises controlling relative movement of the sensor and the head under test using two degrees of motion.

In one embodiment, the processing of the map comprises de-convolving the map so as to obtain a resultant two-dimensional magnetic map.

In one embodiment, the de-convolving is performed using a Richardson-Lucy blind de-convolution algorithm. Thus, the processing of the image can be performed without any prior knowledge of the spatial sensitivity of the sensor.

According to a fifth aspect of the present invention, there is provided a system for generating a magnetic map of a read/write head for a magnetic storage medium, the system comprising: a test sensor for controlled movement relative to a head under test, the test sensor being arranged to detect or generate a test magnetic field; a position controller for controlling the position of the test sensor relative to the said read/write head under test; a processor for generating signals for provision to and receiving signals from the test sensor and the head under test and obtaining measurements from the head under test or the sensor to produce a two-dimensional image representative of a parameter of the head and to process the image so as to determine a two-dimensional magnetic map of the head under test.

According to a sixth aspect of the present invention, there is provided a system for generating a magnetic map of a recording head for a magnetic storage medium, the system comprising: a test sensor for controlled movement relative to a recording head under test, the test sensor being arranged to detect or generate a test magnetic field and the sensor being substantially planar and comprising a pole configured to direct or receive flux in a direction substantially perpendicular to the plane of the sensor; a position controller for controlling the position of the test sensor and/or the recording head under test relative to each other; a processor for generating signals for provision to and receiving signals from the test sensor and the recording head under test and obtaining measurements from the recording head under test or the sensor to produce a two-dimensional image representative of the recording head and to process the image so as to determine a two-dimensional magnetic map of the recording head under test.

In one embodiment, the sensor is arranged to move whilst the head under test remains stationary.

In one embodiment, the head comprises a pole tip shaped so as to provide an accurate magnetic map.

In one embodiment, the sensor comprises plural pole tips.

In one embodiment, the pole tips have different shapes.

In one embodiment, the pole tips are one or more of triangular, rectangular, square, trapezoidal and L-shaped.

In one embodiment, relative movement of the sensor with respect to the head under test is controlled using two control systems including both a coarse control system and an accurate control system.

In one embodiment, the movement of the sensor is along a defined trajectory which is selected from the group including spiral movement and side to side translational movement.

In one embodiment, the angle of the sensor is varied during testing so as to enable an accurate determination of the magnetic map.

According to a seventh aspect of the present invention, there is provided a method of making a hard disk drive, the method comprising: providing a recording head for a hard disk drive; and, scanning the recording head during manufacture using a method according to the first aspect of the present invention.

It will be appreciated that during manufacture of a hard disk drive, many steps are required both of manufacture and assembly. In addition, the present invention, in this aspect, comprises during manufacture or assembly of a hard disk drive, the process of scanning the recording head to determine its magnetic field or magnetic field sensitivity. The process of scanning is quick enough and efficient enough to be used during the normal process of manufacture and assembly of the hard disk drive which means that this important test can easily and conveniently be introduced to the manufacture or assembly process.

Typically, early in the manufacturing process for the heads after the head dimensions have been defined but before high cost operations such as suspension attachment have been performed, a magnetic sensor is moved relative to and in close proximity to the recording head under test; measurements are obtained from the recording head under test or the sensor to produce a two-dimensional image representative of the recording head, which is then processed to obtain a map of the magnetic field or field sensitivity of the recording head under test. This is then used to determine the quality of the head and whether it is to be processed further.

According to an eighth aspect of the present invention, there is provided a method of generating a sensor sensitivity map for a magnetic sensor for use in the mapping of the magnetic field or magnetic field sensitivity of a magnetic recording head, the method comprising: providing a recording head with a known magnetic field or magnetic field sensitivity, scanning the recording head with a magnetic sensor having an unknown sensitivity map; generating an image by said scanning; from said image and the known magnetic field or magnetic field sensitivity of the recording head determining the sensor sensitivity map for a magnetic sensor.

According to a ninth aspect of the present invention, there is provided a test system for generating a magnetic map of a head under test, the system comprising: a position controller for accurately controlling the position of a test sensor relative to a head under test; a processor for generating and receiving signals so as to determine a two-dimensional magnetic map of the head under test.

Embodiments of the present invention will now be described in detail with reference to the accompanying drawings, in which.

Figure 1:
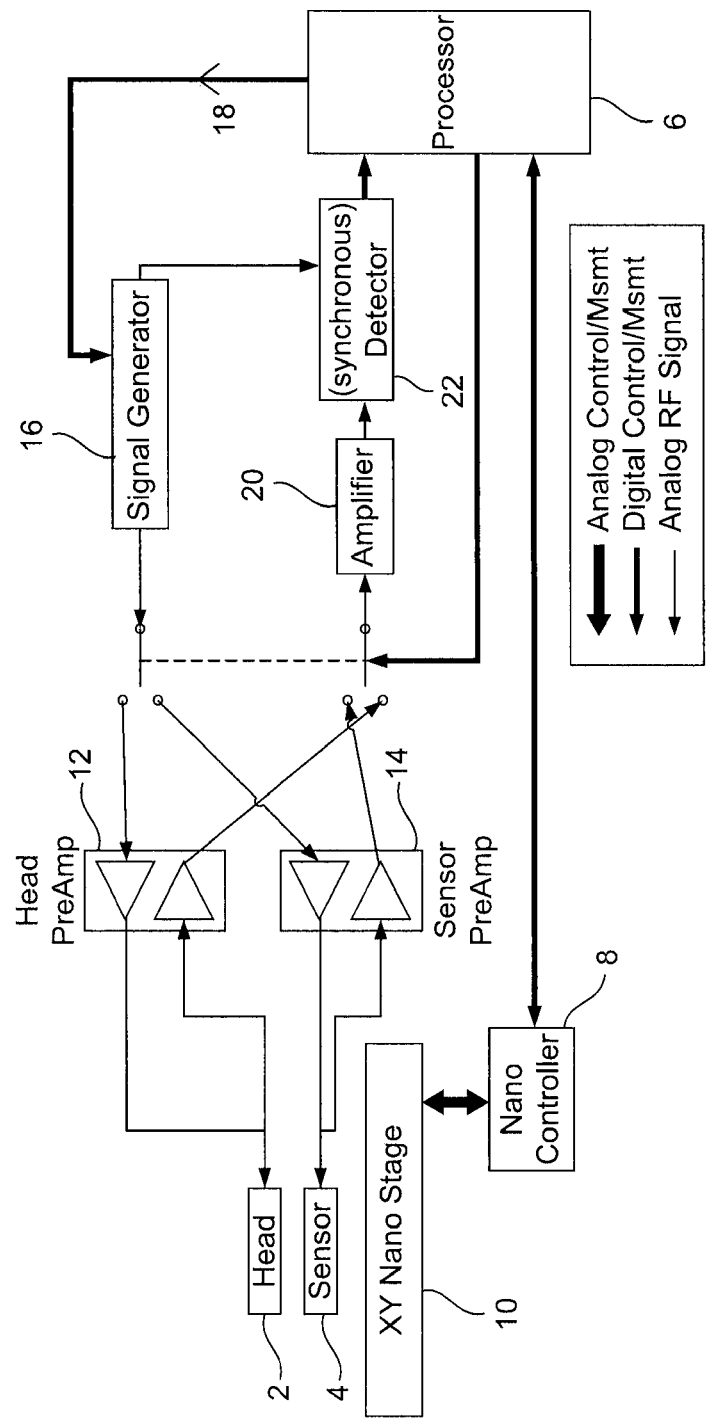
FIG. 1 is a schematic representation of a scanning system.

FIG. 1 shows a schematic representation of a measurement system. The measurement system is for mapping the magnetic field or magnetic field sensitivity of a recording head 2 under test which may be a recording head that is from or forms part of a hard disk drive. In other words, the type of head for which the measurement system is typically provided for use, is a HDD read/write head. In general, the measurement system serves to generate a map of the magnetic field or magnetic field sensitivity of a recording head.

As will be explained below, the measurement system is able to provide an accurate representation of a 2 dimensional magnetic field map in a quick and efficient manner such that the system is suitable for use in the testing of HDD heads during manufacture of HDDs. This is extremely useful since the system does not suffer from the problems mentioned above with respect to the available prior art, i.e. high cost and complexity and the long duration of a test.

In more detail now, the measurement system comprises a sensor 4 movable under control of a processor 6. The sensor, to be described in greater detail below, is moveable close to the recording head under test. In other words it is moved close enough so that the magnetic field of the sensor can be detected by the head and vice versa. Typically, the sensor might actually be in contact with the recording head during a test. In some cases a small separation might be present such as between 0 nanometers and 20 nanometers determined in part by the design of the head being tested. In some examples, in use, the sensor is held stationary and the recording head is moved. What is important is that there is relative movement of the sensor with respect to the recording head. Furthermore, the relative size of the sensor shield and its generally flat upper surface ensures that it is able easily, quickly and efficiently to scan a read or write head.

A nanocontroller 8 is provided in communication with the processor 6 and is for providing nanocontrol of the movement of the sensor 4 via, what is labelled, a "nanostage" 10. The nanocontroller 8 is arranged to receive signals from the processor 6 and provide control signals to the nanostage 10 so as to cause the sensor 4 to move in a desired manner and on a very small scale. Such accurate and precise control of the small scale movement of the sensor is required to enable the sensor to generate the data needed to produce an image of the magnetic field or magnetic field sensitivity of the head under test.

As will be explained below, the nanostage 10 is preferably the second movement control mechanism. The first serves to locate the sensor in the right general area for testing, such that the second, the nanostage 10, can then be used for the accurate XY position control of the sensor 4 relative to the head under test. This has the benefit that the nanostage 10 does not need to be able to move the sensor over large distances, but only over the small distances needed for the relative movement between the sensor and head in performance of a measurement or scan.

In this example, two preamplifiers 12 and 14 are provided. First, a test head preamplifier 12 is arranged to provide signals to and receive signals from the head 2 under test. Second, a sensor preamplifier 14 is arranged to receive signals from and provide signals to the sensor 4.

A signal generator 16 is provided in communication with the processor 6. In use, the processor 6 generates control signals that are provided to the signal generator 16. Typically the signal provided to the signal generator from the processor is a digital control signal. The signal generator 16 in turn provides drive signals, via the preamplifiers 12 and 14 to the head 2 and sensor 4. Typically, the drive signals are analog RF signals.

Whilst the drive signals are being provided by the signal generator 16, control signals, e.g. digital control signals, are provided to the nanocontroller 8 and subsequently to the nanostage 10 so as to ensure that the sensor 4 is moved in a known manner to correspond to the signals provided by the signal generator 16. It will be appreciated that for the signal generator 16 and the pre-amplifiers 12 and 14, off-the-shelf components may be used. They may be implemented in hardware, e.g. an ASIC, FPGA, or commercial instrumentation or as software running on a processor.

An amplifier 20 is provided together with a synchronous detector 22 to route signals back to the processor 6 from the preamplifiers 12 and 14. Thus, as signals are provided by the preamplifiers 12 and 14, they are routed to the amplifier 20 and from there back to the processor 6 for further processing. A reference signal 24 is provided by the signal generator 16 for the synchronous detector 22 The synchronous detector (sometimes referred to as a "Lockin Amplifier") uses the reference signal 24 from the original signal source in order to separate the sensor signal from the noise.

Operation of the system will be described in detail below. However, for now, in general it will be understood that the system can be used to map the magnetic field or magnetic field sensitivity of a recording head which can be a read and/or a write head. In the case of a write head, the test head 2 is provided with signals via the signal generator 16 and preamplifier 12. The signals are detected by the sensor 4 which generates output signals in dependence on the magnetic field it detects and provides the output signals to the preamplifier 14. From there, the output signals are transferred to the processor via the amplifier 20 and detector 22. The signals may then be processed, as will be explained below, to generate a map of the write head field for the head 2.

When operating so as to characterise the magnetic field sensitivity of a read head, the recording head under test would be the "sensor", i.e. it would serve to detect magnetic fields generated by the actual sensor 4. The function of the sensor 4 itself is reversed so as to provide a magnetic field, rather than to detect one, and the mapping process is then performed in the substantially same way. It will be appreciated that in some cases a sensor is provided which is capable of only testing either a read head or a write head. It is preferable that the sensor is configured to be capable of testing both a read head and a write head.

In greater detail, when the magnetic field of a write head (a recording head operating in write mode) is to be mapped, the sensor 4 is scanned across the write head, or vice versa, in X and Y directions. Whilst the scanning is happening, the write element of the head is excited at an RF frequency as if writing to a disk. As the sensor 4 scans in the X and Y directions relative to the head 2, at each point along its scan, it picks up a magnetic signal, i.e. detects the varying magnetic field, from the write element of the head 2 excited at the RF frequency. The sensor 4 generates an output signal which is provided to the preamplifier 14 and amplifier 20 for amplification. The signal is preferably then filtered and a narrow band measurement made Next, a two-dimensional image is generated of the signal strength versus the XY position. In other words, at each selected XY position a reading is made so that a two-dimensional scanned image is thus built up during a scan. A typical scan result (after having been further processed) can be seen in FIG. 23.

Once a two-dimensional scanned image has been obtained in this way, the write head magnetic field of the head under test is then extracted by de-convolving the two-dimensional scanned image from the spatial sensitivity of the sensor 4. This will be explained in more detail below.

In terms of dimensions, typically, a normal write head map would be approximately 200 nanometers by 200 nanometers with a resolution of between 2 and 5 nanometers. The same method could also be used to map the characteristic magnetic field of the write head return pole.

Figure 2:
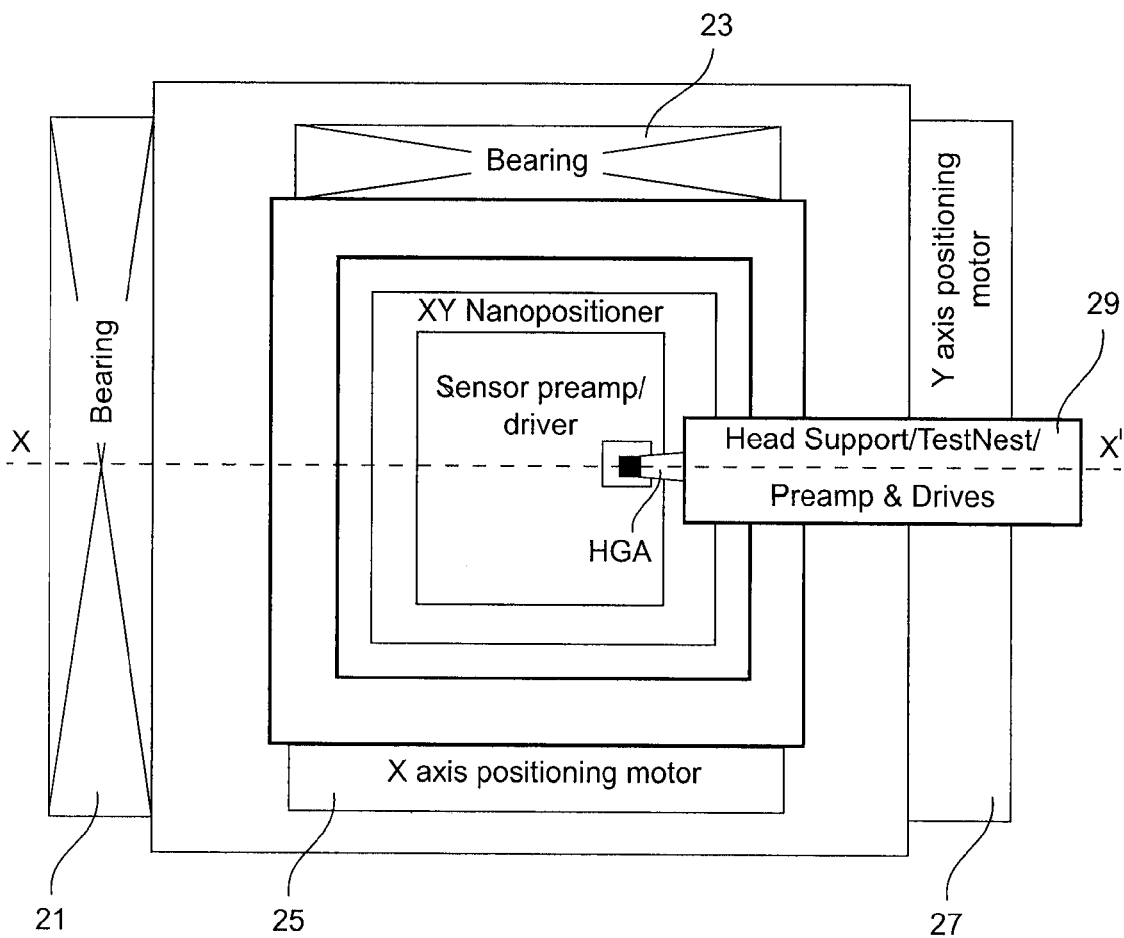
FIG. 2 is a schematic representation of a plan view of a scanning system.

The relative XY positions of the sensor 4 and the head 2 under test must be known so as to enable a scan to be performed. Accordingly, the XY nanostage 10 is used to ensure accurate positioning of the sensor 4 relative to the head 2 and small scale movement of the sensor 4 relative to the head. FIG. 2 shows a schematic representation of a positioning system that would typically be used. In an embodiment, a support arm 29 is typically provided as part of the test assembly to support a recording head under test. This can be any appropriate type of support mechanism. In addition, the Z axis displacement must also be known and controlled. As will be explained in detail below, this can be achieved by providing a sensor with a relatively large flat shield.

To enable precise alignment between the recording head under test and the sensor, typically two movement stages or systems are provided. A coarse positioning system is provided capable of resolution to within, say, 100 nanometers, but able to move over a relatively large distance, i.e. several millimeters. In addition, a final stage positioning system (the nanostage 10) is provided, capable of movement to accuracy within less than 1.0 nanometers. The final stage positioning system would typically be provided arranged on the coarse positioning system. In use, first the coarse positioning system is controlled so as to bring the sensor within the right general area for a scan of the recording head under test. Then, once in this position, the final stage positioning system may be controlled to move the sensor accurately along its scan trajectory.

The signals that will be provided by the sensor 4 as it scans across the write head under test 2, will typically be small but are accurately measured, e.g. preferably to within 1% accuracy. To achieve this, a narrow band spectrum analyser is used together with integration (averaging) over a suitable time period. Alternatively, synchronous detection with a lock-in amplifier may be used.

Prior to use of the system, the spatial sensitivity of the sensor 4 is preferably accurately mapped, so as to enable a subsequent de-convolution to take place. In other words a calibration map of the sensor is provided prior to the actual scanning of a recording head. This mapping of the spatial sensitivity of the sensor 4 only needs to be done once so that the spatial sensitivity of the sensor 4 is known. Typically, atomic force microscopy, i.e. an extremely accurate method of mapping, is used to map the spatial sensitivity of the sensor so as to provide the calibration map. Once this has been done, the sensor can be used as desired. In an alternative, instead of using atomic force microscopy, or any other such method of mapping of the sensor sensitivity, initial measurements with a sensor can be made of a previously characterised, i.e. mapped, recording head which will thus enable the sensor sensitivity to be determined.

Figure 3:
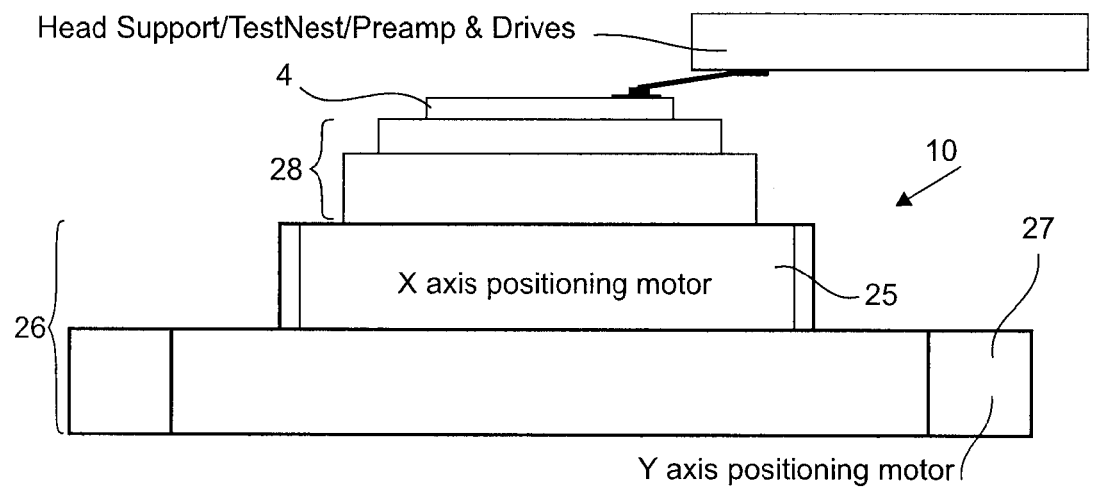
FIG. 3 is a view of a vertical section along the line X-X' in FIG. 2.

Alternatively, if it is desired blind de-convolution may be used using the Richardson-Lucy algorithm or similar without prior knowledge of the sensor sensitivity Referring now to FIGS. 2 and 3, a system for controlling the position of the sensor 4 during operation will now be described. As mentioned above, two positioning systems are provided, which are preferably independently controlled. A coarse positioning system 26 is provided together with an accurate or final stage positioning system 28 arranged thereon. The sensor 4 is provided on the final stage positioning system 28 or XY nanostage 10. Thus, the coarse positioning system 26 can be used to bring the sensor 4 to within the approximately correct position for sensing and then accurate control of the sensor, i.e. for scanning itself, is performed by the XY nanostage 10.

Any suitable form of bearings and control mechanism can be used. In the non-limiting example shown, two motors are provided, for each of the systems 26 and 28. In other words, for the coarse positioning system 26 an x-axis positioning motor 25 and a y-axis positioning motor 27 are provided for controlling movement of the system on bearings 23 and 21, respectively Motors are also provided for control and operation of the final stage positioning system 28. Whilst in some embodiments there is provided both a coarse XY positioning system and a fine XY positioning system which are separate, in some embodiments this is not the case. Indeed, in some embodiments, there is only a single positioning system which can accomplish both the range of movement of the coarse system and the resolution of the fine system.

Figure 4:
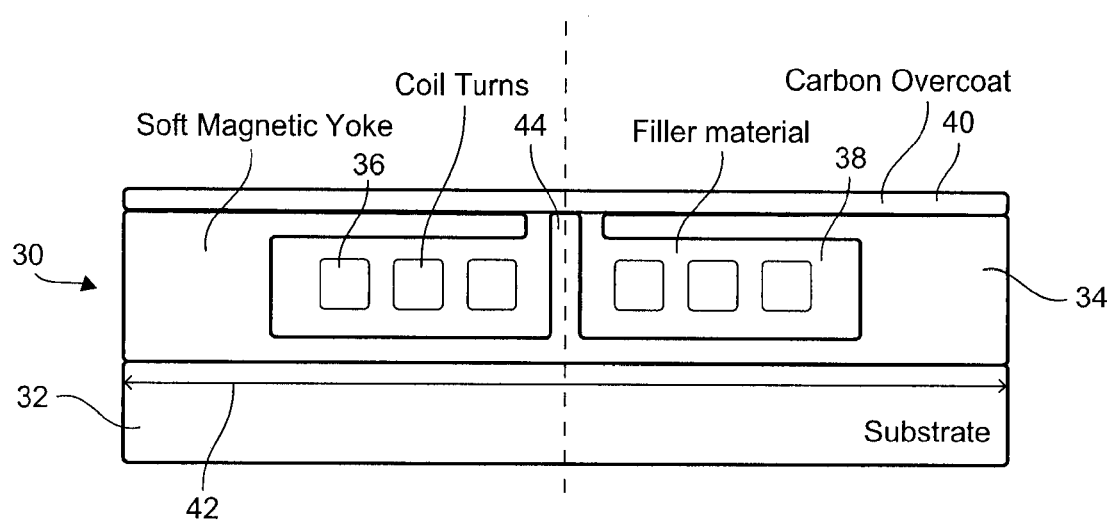
FIG. 4 is a vertical section through a sensor for use in the apparatus of FIGS. 2 and 3.
Figure 5:
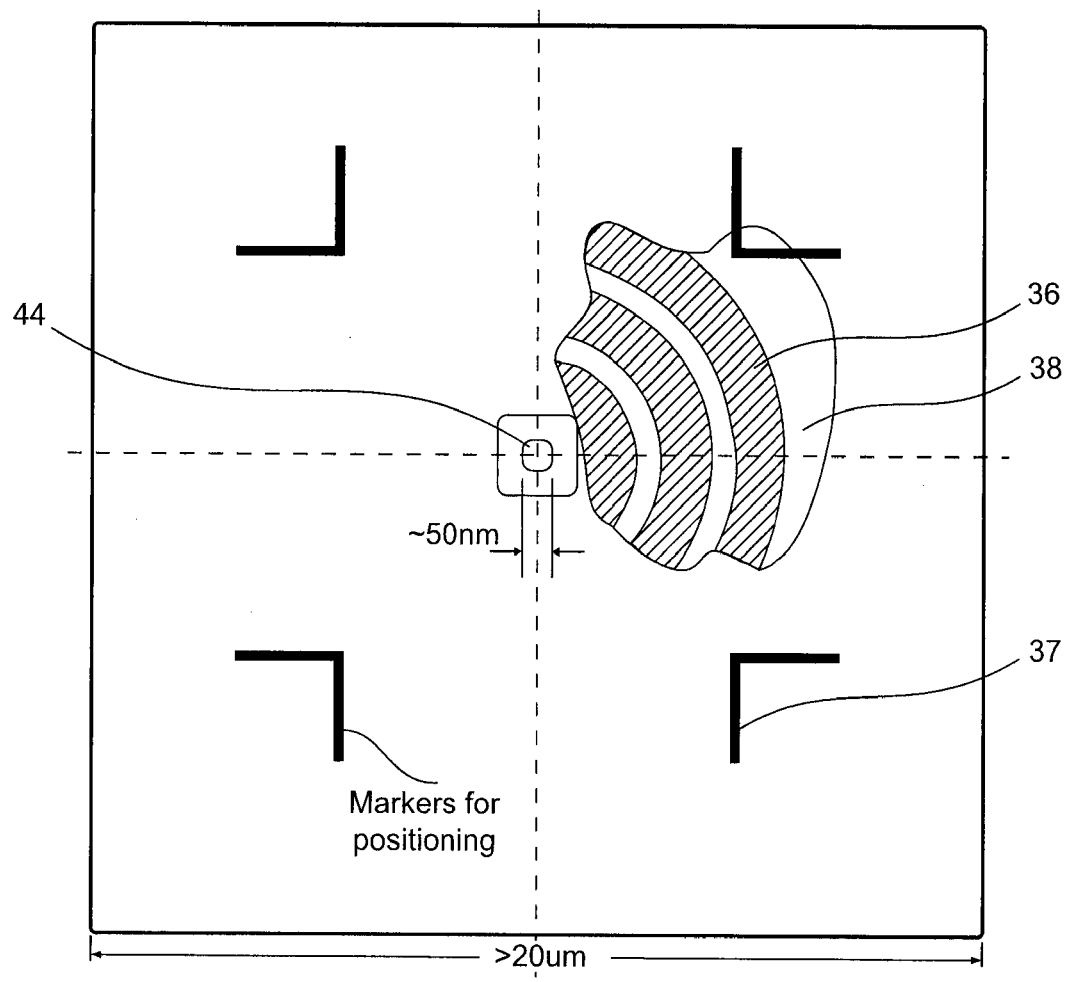
FIG. 5 is a plan view of the sensor of FIG. 4.

FIG. 4 shows a schematic representation of a section through an example of a sensor 4. The sensor comprises a main body 30 and a substrate 32. Formed on the substrate 32, is a magnetic sensor mechanism including a soft magnetic yoke 34 together with plural turns 36 of a coil. A filler material 38 is provided and surrounds the coil turns 36. A surface layer 40 is provided on top of the sensor. The surface layer 40 is preferably textured so as to ensure that the head under test and the sensor do not stick to each other. A controlled roughness or texture provided on the surface 40 ensures that the sensor will not stick to the head. In one embodiment, the surface of the sensor is provided with a Surface Wave Transducer (SWT) which serves to generate moving waves or ripples in the surface of the sensor and thus ensures that, in use, it does not stick to the recording head under test. The use of a large flat shield together with some means for avoiding sticking ensures that a reliable engagement between a sensor and head under test can be achieved.

As can be seen, the sensor is generally planar and the sensor pole 44 is arranged to direct magnetic field lines in a direction perpendicular to the plane of the sensor and shield.

In another embodiment, the surface of the sensor may be patterned using the method for laser patterning of surfaces disclosed by U.S. Pat. No. 5,567,404. The process disclosed is for creating an array of bumps to texture a brittle non-metallic surface such as a glass substrate for data recording disks. The texturing process uses a laser to provide pulses of energy to the brittle glass surface so as to produce a plurality of raised bumps in the surface. The bump creation is accomplished without unwanted micro-cracking or rejection of surface material, by limiting the laser pulse fluence to a value in a narrow operating region below the abrupt thermal shock fluence threshold for the brittle non-metallic surface material.

The width 42 of the sensor is typically about 20 micrometers, but may be anything from about 10 micrometers to about 50 micrometers. The pole tip 44 typically has dimensions of approximately 50 nanometers, but may be anything from about 30 nanometers to about 200 nanometers. The typical pole tip dimensions of approximately 50 nanometers are at the extreme of current lithography capability and in some examples the pole tip dimensions may be greater, e.g. up to 100 or 200 nanometers and will still function perfectly well. The size of the pole tip is significantly smaller than the shield (which generally defines the size or footprint of the sensor). In terms of orders of magnitude, it is preferred that the shield is at least $10^2$, and preferably $10^3$ times wider than the pole tip. Accordingly, in terms of surface area, it is preferred that the overall footprint of the sensor or shield is between $10^4$ and $10^6$ times greater than that of the pole tip.

The shape of the pole tip can be any suitable shape and this is discussed in greater detail below. The examples of the dimensions of the sensor given herein are of course not limiting.

Any suitable materials may be used for the substrate 32, the surface layer 40, the magnetic yoke 34, the filler materials 38 and coils. Typically, the substrate may be a ceramic material such as a dual phase ceramic of alumina and titanium carbide, commonly know as AlTiC In some examples, the substrate is formed of silicon or a metal plate. The sensor is itself, in effect, a thin film magnetic read/write recording head which may be produced by deposition and etching of various layers such that it appears to a PMR recording head as the surface of a HDD with a point source of magnetism.

The sensor preferably also has included on it one or more alignment features 37. The alignment features 37 are provided so as to enable the sensor and the recording head under test to be brought into the right general relative positions for a scan. Indeed, the use of such features enable a quick and efficient alignment of the sensor with the recording head under test. In the example shown, the features 37 comprise optical marking etched onto the surface of the sensor. In such a case an optical microscope would be provided as part of the test assembly. When the sensor was brought to within the vicinity of the recording head under test the optical microscope is used automatically, or manually, to guide the sensor to be in the correct general area. Some means of feedback between the microscope and the coarse XY positioning system is provided (and possibly the fine XY positioning system too) such that upon detection of the alignment features 37 by the microscope a corresponding control signal can be sent to the coarse XY positioning system.

In another embodiment, magnetic structures such as further or additional coils are provided around the sensor. The further or additional coils are structured and arranged such that, when energised with an AC power source, a magnetic field is generated having a null region in the vicinity of the sensor pole tip(s). A magnetic detector is provided as part of the test assembly such that when the sensor is first brought to within the vicinity of the recording head under test, the magnetic detector is used automatically, or manually, to guide the sensor to be in the correct general area. In other words the magnetic detector works in an analogous manner to the optical microscope in the example described above. Any other suitable form of alignment feature could be used. Furthermore, the features could be provided on the assembly holding the head under test instead of or as well as being provided on the sensor. For example, the alignment feature(s) could be provided as part of the support arm 29. In this case the detection mechanism would be provided as part of the sensor.

Figure 6:
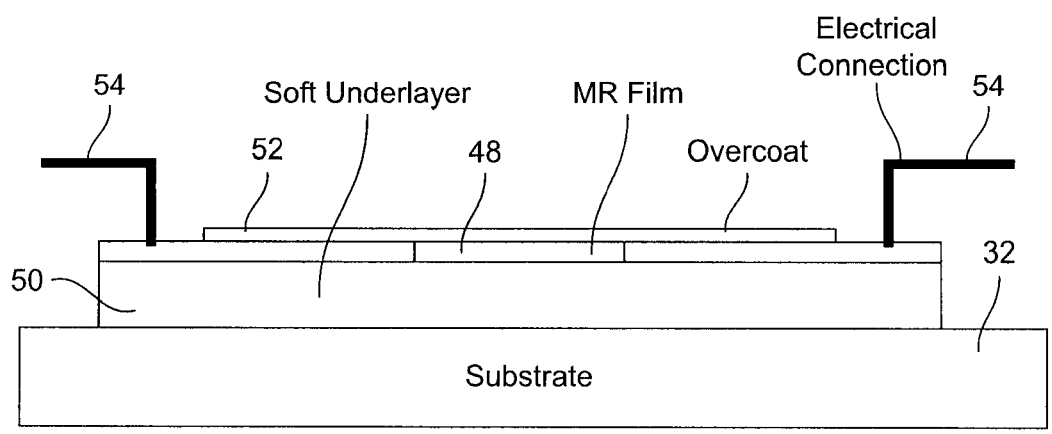
FIGS. 6 and 7 show, respectively, a vertical section through and a plan view of an alternative embodiment of a sensor.
Figure 7:
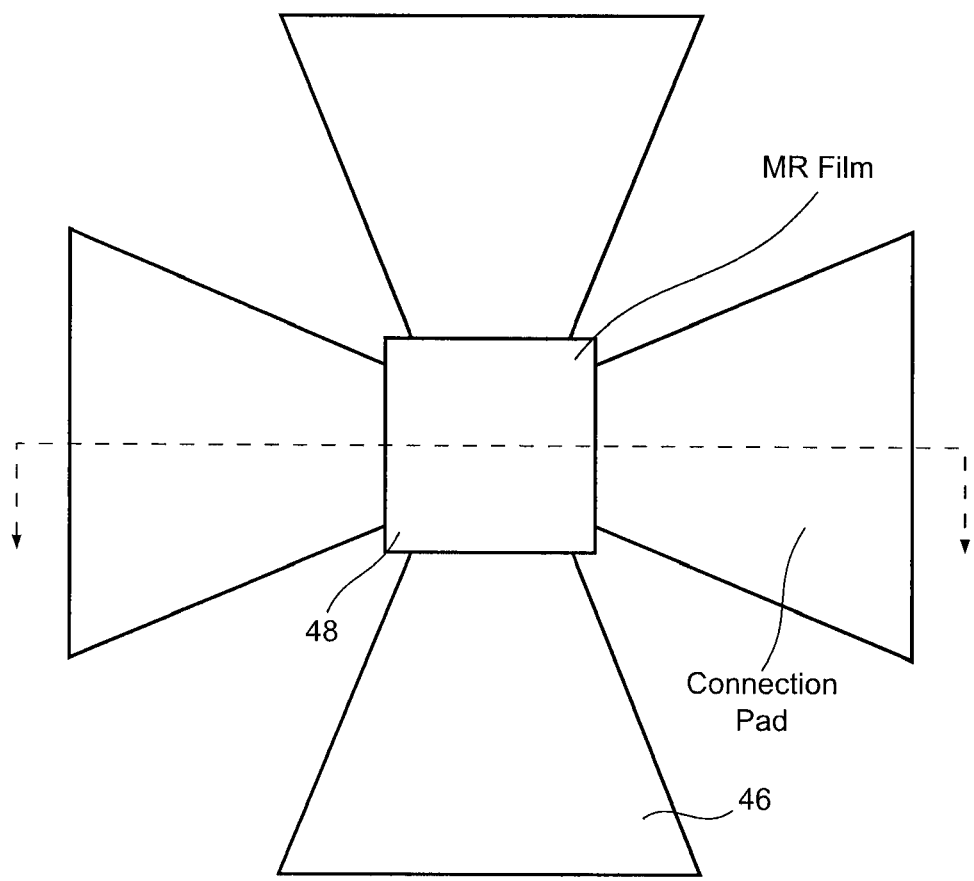

FIGS. 6 and 7 show an alternative embodiment. In this example, again, a sensor is provided formed on a substrate 32. The sensor comprises plural connection pads 46, each in connection with a magneto resistive (MR) film 48. The MR film may be formed of any appropriate material(s). Non-limiting examples include N-doped germanium, silver Telluride, thin magnetic films of perovskite and similar materials (complexes of Calcium Manganese and Oxygen with other elements). A soft under layer 50 is provided and a protective overcoat 52 is formed above the MR film 48. The overcoat may be formed of any appropriate material. One non-limiting example is Diamond Like carbon (DLC). Electrical connections 54 are provided. The sensor of FIGS. 6 and 7 is capable of mapping, but not of generating a magnetic field. Accordingly, such a sensor can only be used to measure the write head field and not to test the magnetic field sensitivity of a read head. The sensor relies on a bulk property of the medium such as an MR resistance or the Hall effect to sense the magnetic field of the head under test. The means by which the sensor is used is effectively the same as that described above with reference to any of FIGS. 1 to 5. In other words, the sensor is moved relative to the recording head under test and a map of the magnetic field generated by the write head may thus be determined.

It will be appreciated that other forms of sensor may be used. What is required is a sensor that is able to be moved in a precise controlled manner relative to a recording head under test and that is able to pick up, detect or generate magnetic fields of the order of magnitude which would be detectable or produced by a HDD recording head to be tested.

As explained above, due to the fact that the sensor pole tip has some surface area, i.e. is not a singularity (in the examples above the pole tip 44 typically, when square, has dimensions of about 50 nm), it is necessary to perform some further processing on the output signal (representing the two-dimensional scanned image) so as to generate an accurate map for the magnetic field or magnetic field sensitivity of a recording head.

Typically, de-convolution is used to provide a magnetic map of the head. In other words, a means is required to enable an accurate 2D map to be generated from the two-dimensional scanned image despite the inevitable "fuzziness" that is a consequence of the finite size of the sensor. One way by which this can be achieved is by a blind de-convolution using an algorithm such as the Richardson-Lucy algorithm. This is well known to the skilled person. A detailed description of the method by which blind de-convolution may be performed is not required. However, a full exposition of this can be found in, for example, D. A. Fish, A. M. Brinicombe, E. R. Pike, and J. G. Walker, "Blind deconvolution by means of the Richardson-Lucy algorithm," J. Opt. Soc. Am. A 12, 58-65 (1995), the entire contents of which are hereby incorporated by reference.

In embodiments, the sensor is preferably reversible. In other words, it can act both as a magnetic field source and a magnetic field measurement device. As one possible example, the device of FIGS. 4 and 5 can be used as a magnetic field source if currents are provided to the coils or as a magnetic field measurement device if currents generated in the coil due to change in flux of an external magnetic field, are measured. The sensor of FIGS. 4 and 5, and indeed other embodiments, are fabricated as a magnetic coil with a yoke to shield the coil and confine the flux. In addition, in one embodiment, the sensor may be provided with plural coils and poles in close proximity. Preferably, each pole is a different shape.

The aim of combining the magnetic maps taken with several sensor shapes or a single sensor in several orientations is to be able to synthesise approximately the map which would have been obtained using a single ideal sensor with a very small pole tip. The ideal sensor is ideal because in the spatial frequency domain, obtained by taking the 2D Fourier transform of the pole shape, every frequency component has the same magnitude and none of them are zero. The real pole tip shapes are chosen such that for every spatial frequency at least one of the sensors has a non-zero component such that when the sensors are combined there are no zero components.

When detecting the write field of a recording head, good noise performance, i.e. a low signal-to-noise ratio (SNR), is preferred. This is particularly the case when a de-convolution is performed as the de-convolution can, in some cases, amplify inaccuracies in the original measurement (the output signal from the sensor during the scan). To achieve a low SNR, a narrowband bandwidth is chosen to give approximately 50 dB SNR assuming a 50 Ohm sensor equivalent noise resistance at room temperature. No amplification noise has been accounted for. The SNR can be improved by reducing bandwidth or averaging the measurement over a longer time.

Figure 9:
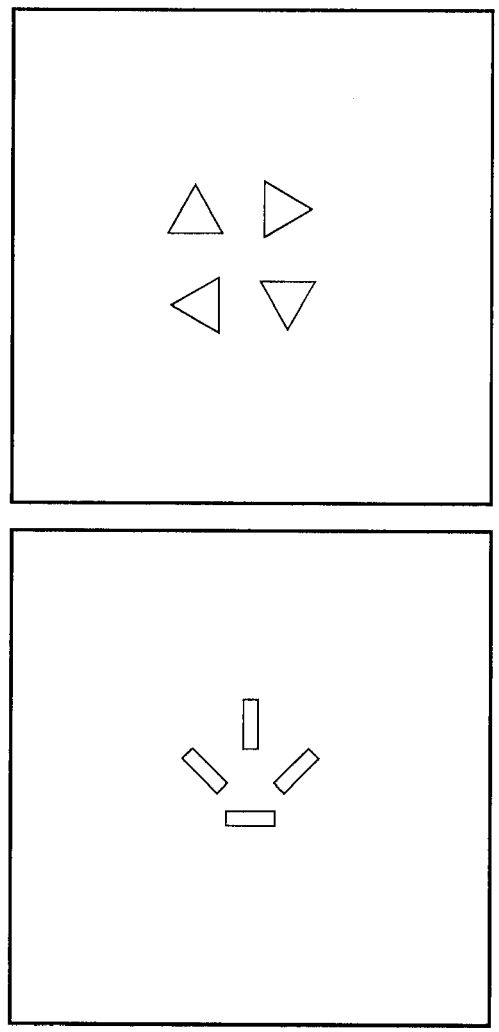
FIG. 9 is a schematic representation of a sensor with plural pole tips.
Figure 8:
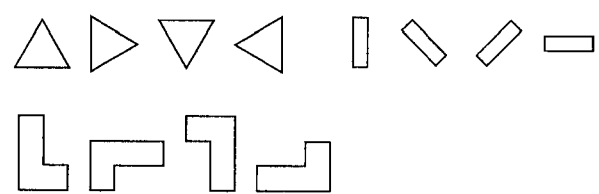
FIG. 8 is a schematic representation of various pole tip shapes.

Referring to FIGS. 8 and 9, examples are given of multiple shaped pole tips and sensors that include plural poles which are shaped accordingly. Each of the poles will include its own separate coil. The use of multiple pole tips, preferably of different shape, and a scanning method so that during a scan of a head, the head passes over each pole tip within the sensor to create multiple two-dimensional scanned images, enables a more accurate result to be achieved, as described above. In particular, the multiple scanned images can be combined to produce a refined two-dimensional scanned image which is, in turn, used to determine the magnetic map or magnetic sensitivity map. In FIG. 9 two examples are shown of multi-pole tip sensors. In the upper figure within FIG. 9 four triangular pole tips are included in the sensor, each of the pole tips being rotated 90 degrees clockwise relative to its nearest anti-clockwise neighbour. Thus, the pole in the top left is triangular with its base horizontally oriented and the triangle extending upwards from the base. The pole tip in the top right corner has its base oriented vertically with the triangle extending to the right, and so on.

In the lower figure within FIG. 9 four rectangular pole tips are included in the sensor. The top centre pole tip is oriented vertically, the bottom centre horizontally. The left and right pole tips are each inclined at an angle of 45 degrees with their respective inner longitudinal ends being lowermost.

Figure 10:
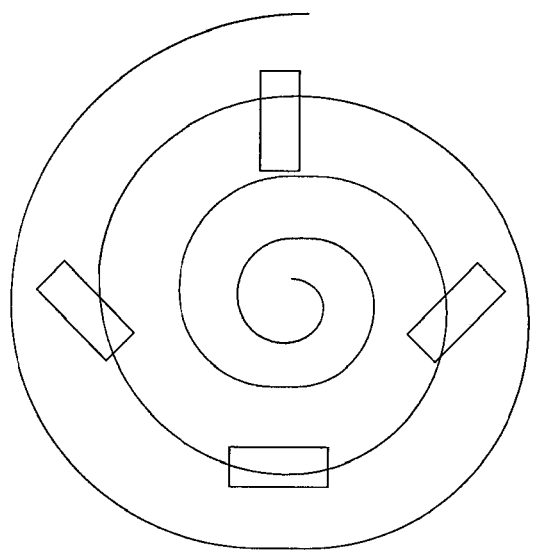
FIGS. 10 to 13 show schematic representations of various pole tips and scanning trajectories.
Figure 11:
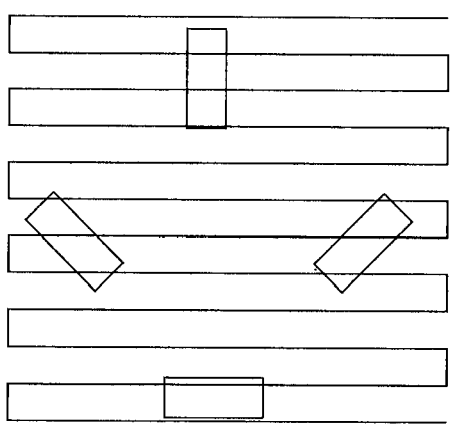

FIGS. 10 to 13 show examples of possible trajectories for the sensor. In FIG. 10, the sensor comprises four rectangular shaped pole tips (in the same configuration as the pole tips of the sensor of the upper figure within FIG. 9) and a single spiral trajectory is used. Each of the pole tips of the sensor shown in FIG. 10 may be different shapes, or some may be the same and some different. In FIG. 11, the pole tips are the same as shown in FIG. 11. A side to side scanning motion is used with a climb (or descent) at the end of each crossways scan.

Figure 12A:
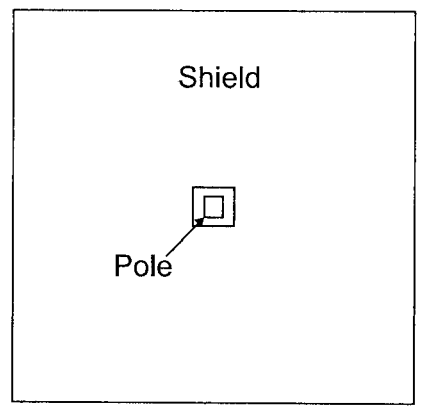
Figure 12:
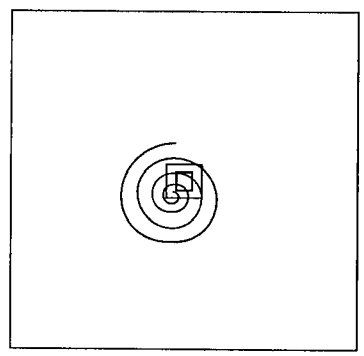
Figure 13:
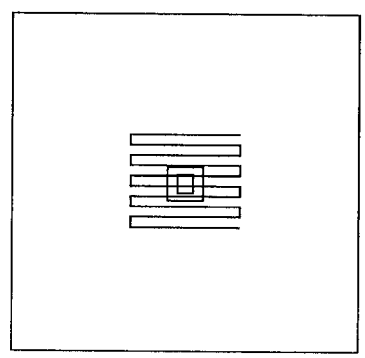

In FIG. 12A a sensor with a single square pole tip is shown. FIGS. 12 and 13 a spiral and side to side scanning technique is used, respectively, similar to those of FIGS. 10 and 11. Other possible scanning trajectories can be used. In one embodiment, a zig zag trajectory is used. It will be appreciated that the scan must cover a 2 dimensional area (the area of the recording head to be scanned) and so where a side to side or zig zag trajectory is used, typically this will be repeated at small displacements across the scan so as to cover the desired scan area.

Preferably, the relative angles of the recording head under test and the sensor is fixed and they are substantially parallel. In other words the plane of the sensor is parallel to the plane of the recording head under test. However, in some embodiments the angle of the sensor is changed so as to obtain a different reading of the field or sensitivity from the recording head. Alternatively, or as well, de-convolution accuracy can be improved if multiple images are taken with the relative angle of the sensor and the head is changed by a known amount between each image. For example, a first image might be generated with the sensor at a "home" position and a second image with the sensor rotated by 90 degrees.

Furthermore, in some embodiments, a head being mapped is scanned two or more times using the same sensor held at different angles and then blind de-convolution is used to determine a most likely head sensitivity without actually knowing the sensor sensitivity shape.

It will be appreciated that in all cases what is being achieved is the mapping of a magnetic recording head magnetic field or magnetic field sensitivity using a magnetic sensor with low spatial resolution such that the resulting map has a high spatial resolution. As compared to spinstand testing or other known methods, referred to above, the present system is faster, more compact and less complex and costly. Indeed, compared with traditional quasi-static testing, the present system is complimentary and could be done on the same fixture giving additional information on head performance.

Compared with current scanning and measurement methods, such as the Heidmann and Taratorin method described in the article "Recording Head Characterisation Using A Narrow Domain Wall In Epitaxial Garnet Films" referred to above, the present method provides a finer resolution, i.e. a better image, in a shorter and quicker time. Thus, a device and method is provided that enables the read and write capability of a magnetic disk drive head to be measured without using an expensive spinstand.

Indeed, using the method and apparatus described herein, it is possible to determine the write field from a writing head such as a PMR (Perpendicular Magnetic Recording) head with 1% amplitude resolution and 2 nm spatial resolution in an extremely short period of time. Typically such a reading or determination might be done in under 10 seconds. This short time scale is quick enough to enable the method to be used as a test during the manufacture process of a HDD. Furthermore, it is also possible to determine the read element near field sensitivity of an MR (Magnetic Recording), GMR (Giant Magnetic Recording) and a TMR (Tunneling Magnetic Recording) read element sensor with 1% amplitude resolution and 2 nm spatial resolution in the same short period of time, i.e. <10 s.

It will be appreciated that the present magnetic sensor is part of a scanning device, commonly known as a scanning magnetic microscope, such as that shown in FIGS. 1 and 2. An active part of the sensor is a magnetic sensing pole fabricated from a soft magnetic material embedded in a large area, referred to as the shield, of a similar material. The shield functions as a return pole for the magnetic circuit created when the sensor engages with a read or write head under test. Preferably, the sensing pole is of similar or smaller dimensions than the active write pole of the perpendicular magnetic recording (PMR) head to be tested. When a magnetic circuit is established in use, this will mean that the return pole is substantially larger than the shield of the PMR head to be tested.

The shield and sensing pole of the sensor have a flat active surface which, when brought into close proximity of a PMR head, causes a magnetic circuit to be completed. The circuit includes the write pole of the PMR head, the sensing pole of the sensor, the return pole of the sensor and the shield pole of the PMR head. This can be seen in FIG. 17 in which the magnetic circuit or coupling path can be seen extending through the PMR head 60, the sensing pole 62, the shield 64 and the shield pole 66 of the PMR head. As the sensor is used as part of the scanning system of FIGS. 1 and 2, the sensor is moved in relation to the head being tested by moving either the head or the sensor while the other is fixed.

The head being tested is driven by an AC current so an alternating magnetic field is created at the pole of the write element. The magnetic circuit is thus modulated according to the shape of the magnetic field generated by the magnetic write pole as the sensor and write element move in relation to one another. As explained above, electronics and computing elements in the scanning system function to convert the signals from the sensor into a two-dimensional map of the field created by the write element of the PMR head. This can be used automatically to assess certain parameters of the write element which may be critical to its operation in a magnetic disk drive. Such parameters could include magnetic writer width, high frequency capability and overwrite effectiveness.

Figure 23:
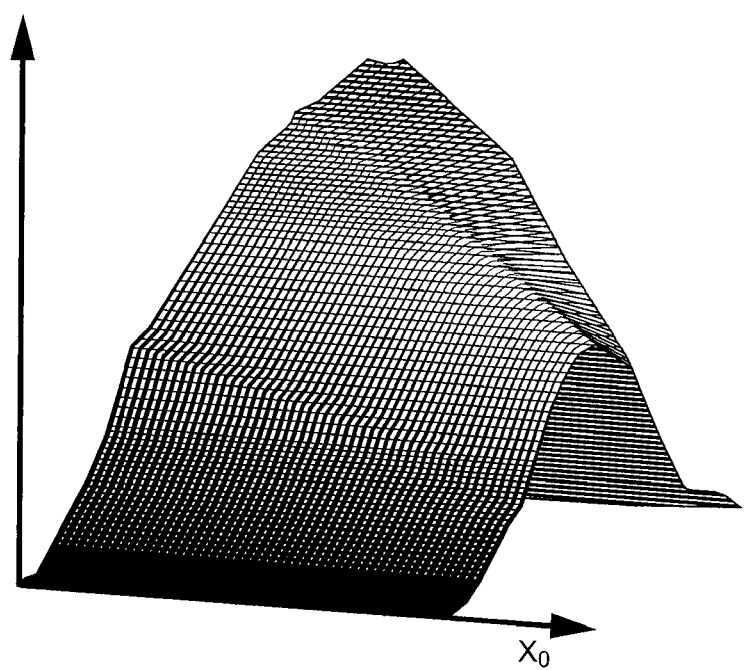
FIG. 23 shows a schematic representation of a 3D plot from a 2D scan, showing the magnetic shape of a write pole under test.

FIG. 23 shows a schematic representation of the detected field strength representing the magnetic shape of the write pole under test. Thus, an accurate three-dimensional plot is generated by performance of a two-dimensional scan. The X and Y axes of the plot of FIG. 23 relate to the plane of the sensor and the magnetic field strength is represented on the vertical Z axis.

Figure 14:
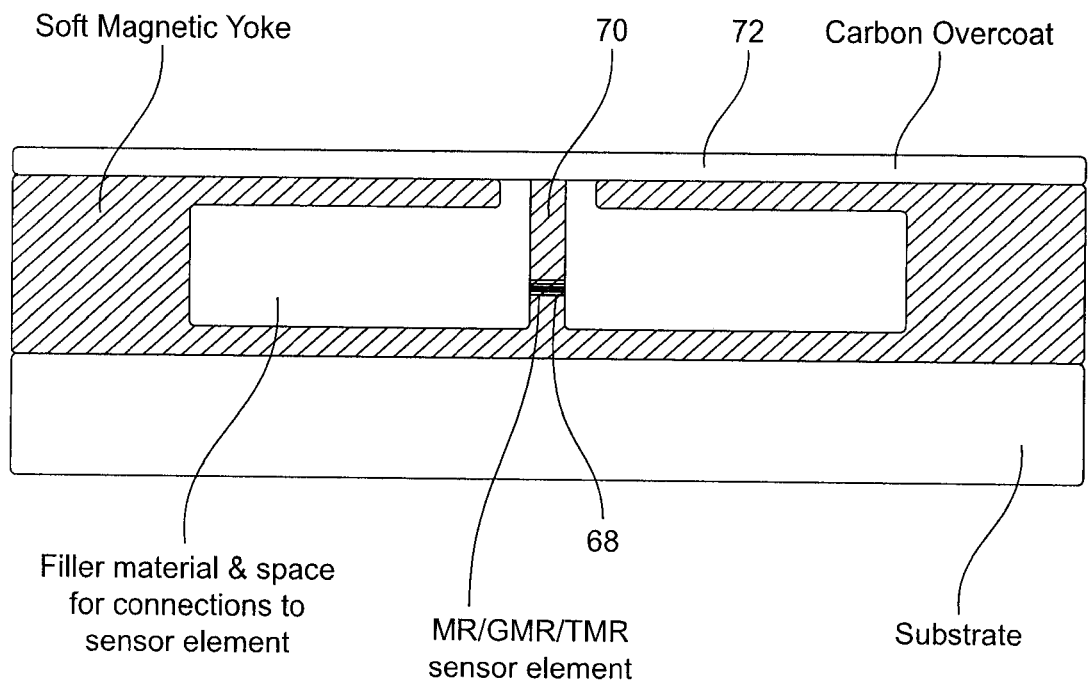
FIG. 14 shows a vertical section through an alternative sensor to that of FIG. 4, for use in the apparatus of FIGS. 2 and 3.

Referring to FIG. 14, a section through an exemplary sensor is shown. The sensor is similar to that shown in, and described above with reference to, FIG. 4. As can be seen, in this case, the sensor is for sensing the operation of a write head only since there is no means for generating a magnetic field within the sensor itself. A MR/GMR/TMR (magnetic resistive/giant magnetic resistive/tunneling magnetic resistive) sensor element 68 is provided within the pole 70. Thus, as the sensor is moved relative to the write head, the magnetic field flowing through the pole 70 will vary accordingly. The generated signal from the sensor element 68 is measured and used to determine various parameters relating to the write head under test.

Certain parameters associated with the surface of the sensor are important since, in use, the surface of the sensor will be in contact with the head. It is important that the surface of the sensor that touches the head is flat. This may be achieved by polishing. It is also preferable that the surface is durable and accordingly, a hard coating such as a diamond like carbon (DLC) coating layer 72 is provided on top of the sensor. This is similar to the coating used in magnetic disk and head manufacture.

Preferably, some features are provided to prevent the very flat sensor from sticking to the head under test. This may be done by providing a controlled texture to the surface. One means by which this can be achieved is by the application of a controlled texture using laser texturing, as described in, for example, U.S. Pat. No. 6,388,229 referred to above. A further step can be taken to lubricate the sensor using disk lubrication such as one or more PFPE greases. Examples include Fomblin Z-Dol or Fomblin-Tetraol.

In the example of FIG. 14, the sensor converts the magnetic field flowing through the pole into an electrical signal using the sensor element. As described above, in the example shown in FIG. 4, instead of use of an MR/GMR/TMR sensor element, a sensing coil 36 is used and the current generated within the coil is measured. Other sensing techniques could also be used, such as use of the Hall effect or a Josephson Junction might be used instead.

One advantage of the use of a sense coil as shown in FIG. 4, is that as well as sensing a magnetic field generated by a write head, the sensor operation can be reversed and a magnetic field can be generated by the sensor device when the sensor coil is driven by a current source. Such a sensor can accordingly be used in two ways. First, a generated magnetic field can be picked up by a PMR write element in close proximity to it and the voltage generated in the write element coil can be sensed in a method which is a reverse of the primary measurement method. In the alternative, a generated magnetic field can be sensed by the read element of the PMR head and used to measure and map the sensitivity function of the read element so a single sensor can be used to evaluate both the write and read elements of a PMR head.

An advantage of the use of an MR/GMR/TMR type sensor is that it can be more sensitive and so smaller magnetic fields can be detected more quickly than can be done with a coil-type sensor. In addition, such sensors can be used at lower frequencies down to constant DC fields. However it can only be used to map the magnetic fields generated by a write element.

Whatever specific type of sensor element used, it will be appreciated that the direction of the magnetic field lines as received by (or transmitted from) the pole, are substantially perpendicular to the plane of the sensor. In other words, the axis of operation of the device is turned through 90° as compared to the typical design of such sensors or indeed a conventional write head.

Figure 15:
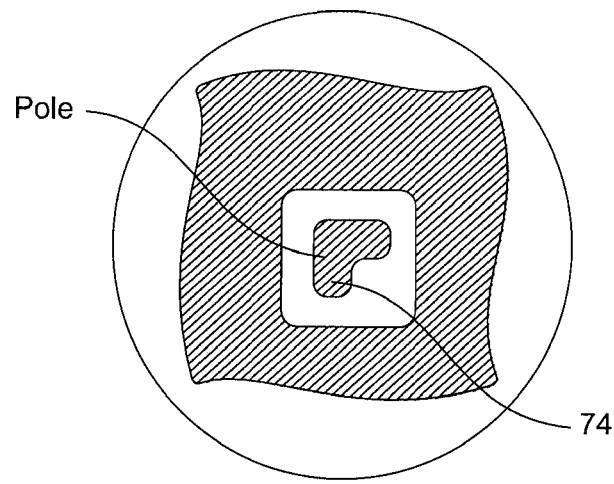
FIGS. 15 and 16 show schematic plan views of a single non-symmetrical pole and plural non-symmetrical poles for use in a sensor such as that of FIG. 4 or 14.
Figure 16:
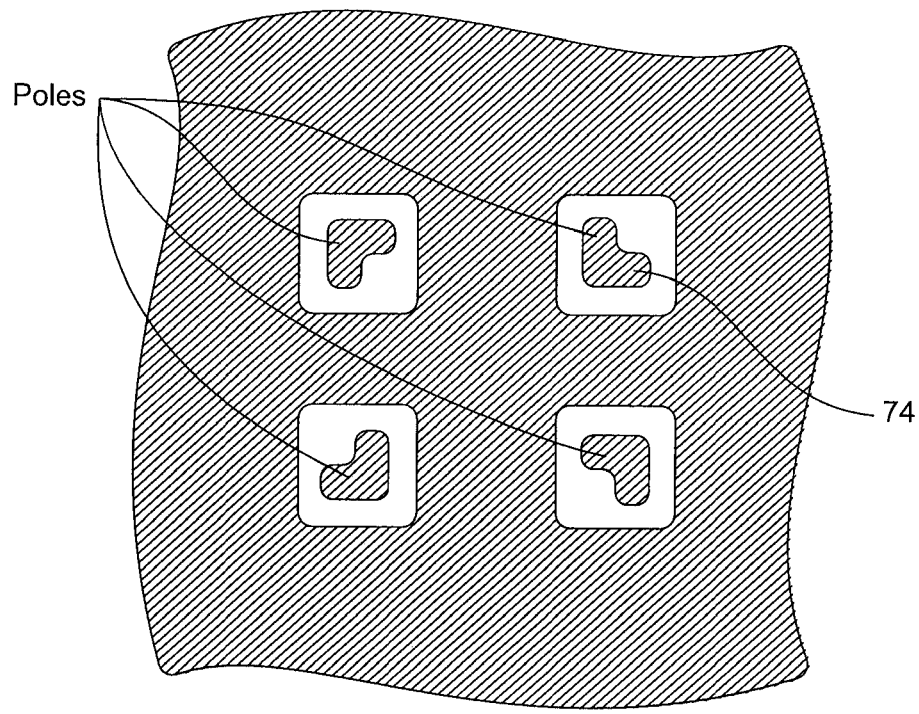

Referring now to FIGS. 15 and 16, examples of non-symmetrical poles are shown. As explained above, the raw scanned data recovered from a head under test, is a convolution of the head effective magnetic field and the sensor pole. In order to obtain an image of the head itself, this must be de-convolved from the sensor shape. This can be done more easily and with greater confidence if the shape of the sensor pole and the expected shape of the head pole are significantly different. Thus, by using an L-shaped pole as shown in FIG. 15, the deconvolution between the typically square pole of a write head and the sensor can be easily achieved.

Furthermore, the results can be improved further if multiple scans are taken where the sensor (or head) is rotated through some angle between each scan. This can be improved on further by embedding several sensor poles of different shapes or orientations, within one sensor such that at any one time only one sensor pole can "see" the head under test, but they can all be covered by the scan. The arrangement of FIG. 16 shows the detail of the top centre of a sensor in which plural L-shaped poles are provided within the sensor, each being oriented in a different manner. This is a particularly preferred pole arrangement since the relative orientation of the L-shaped poles enables accurate mapping of the magnetic field of field sensitivity of a head under test.

Referring again to FIG. 17, the vertical section through the write head pole, exposes the write head coil 65. It will be appreciated that the operation of the write head is as would be well known to a skilled person. In other words, appropriate drive signals would be provided to the coil 65 to as to generate a required magnetic field from the write head pole 60. As the sensor is moved relative to the head under test (or the head is moved relative to the sensor) the magnetic coupling between the two will change. This will be sensed by the sensing element 68 as described above.

Figure 17:
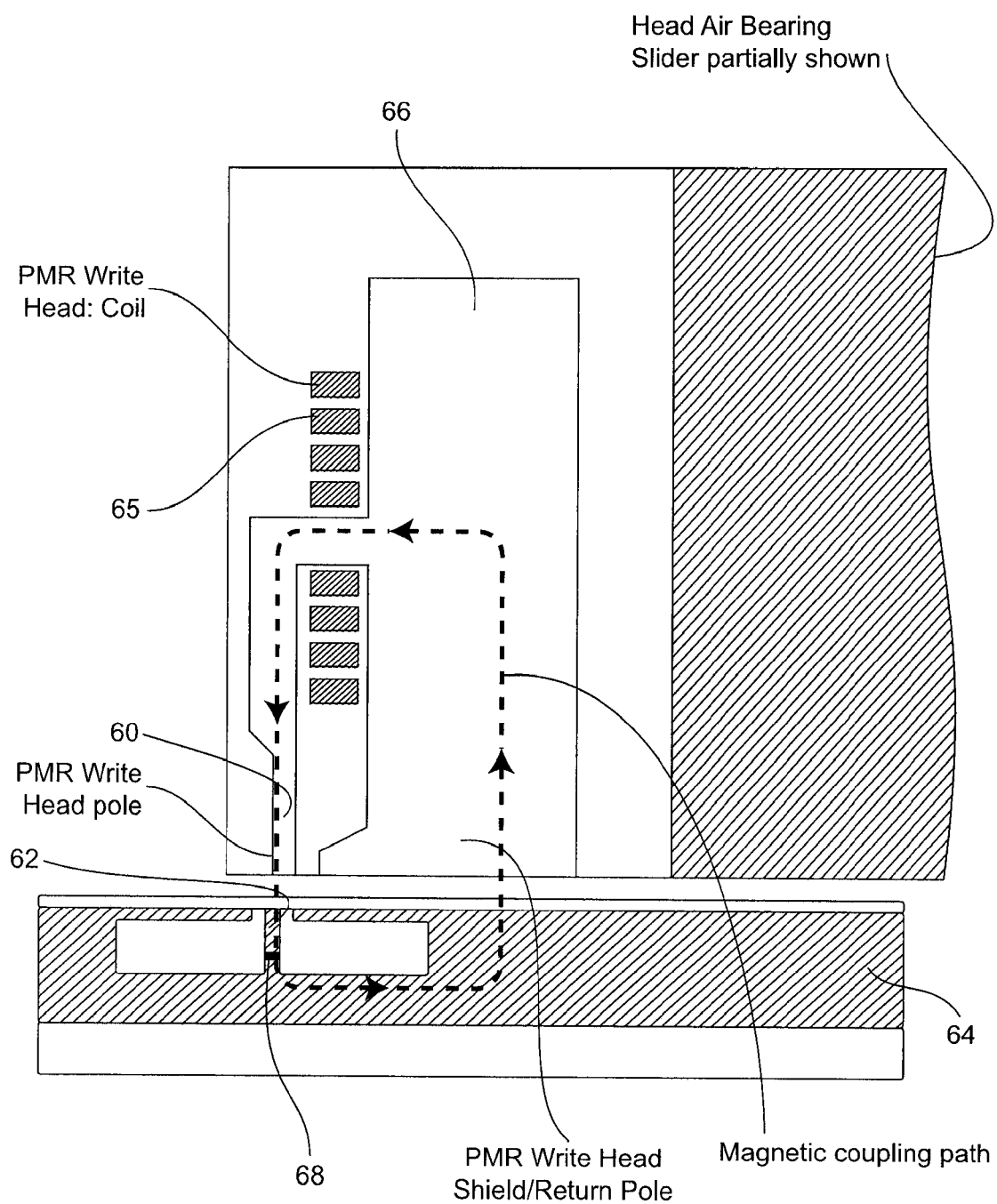
FIG. 17 shows a cross section through a sensor and a representative PMR write head.
Figure 18:
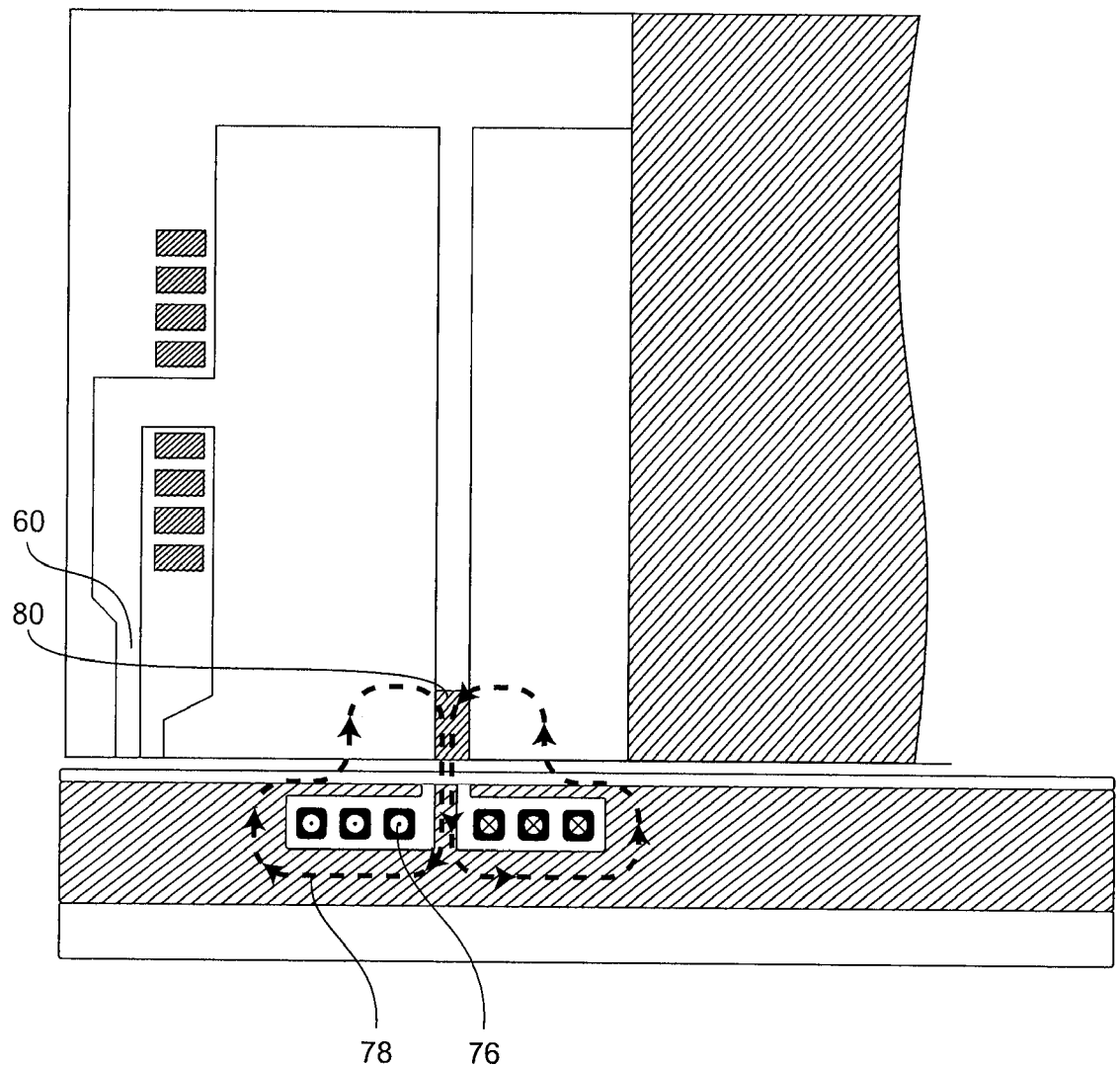
FIG. 18 shows a cross section of a sensor used as an exciter to test a magneto resistive read element.

FIG. 18 shows a cross section through a system similar to that of FIG. 17. In this case, the head under test includes a magneto resistive read element 80. An exciter coil 76 is provided which is able to generate a magnetic field in response to the application of an appropriate drive signal. The magnetic field forms a circuit 78 in combination with the magneto resistive read element 80 within the head under test. It will be appreciated that this same sensor, when moved such as to engage with the write head pole 60 can again be used to scan the sensitivity of the head under test. Thus, a single sensor element can be used to measure both the read and write heads of a PMR head.

Figure 19:
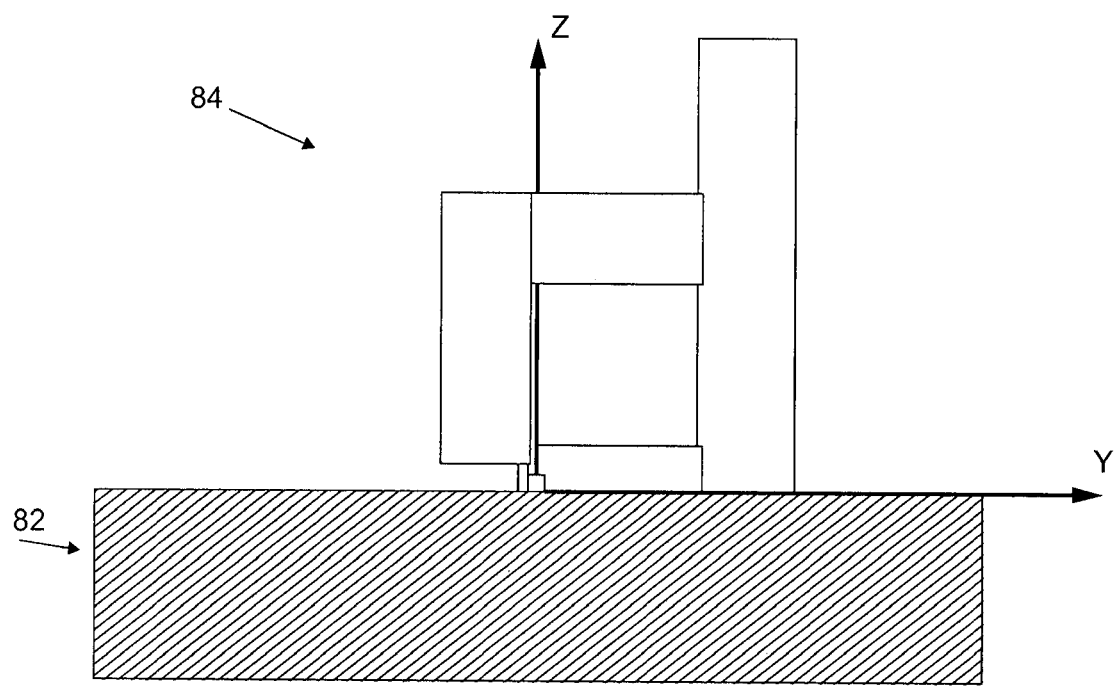
FIG. 19 shows a schematic vertical cross section through a sensor and head under test.
Figure 20:
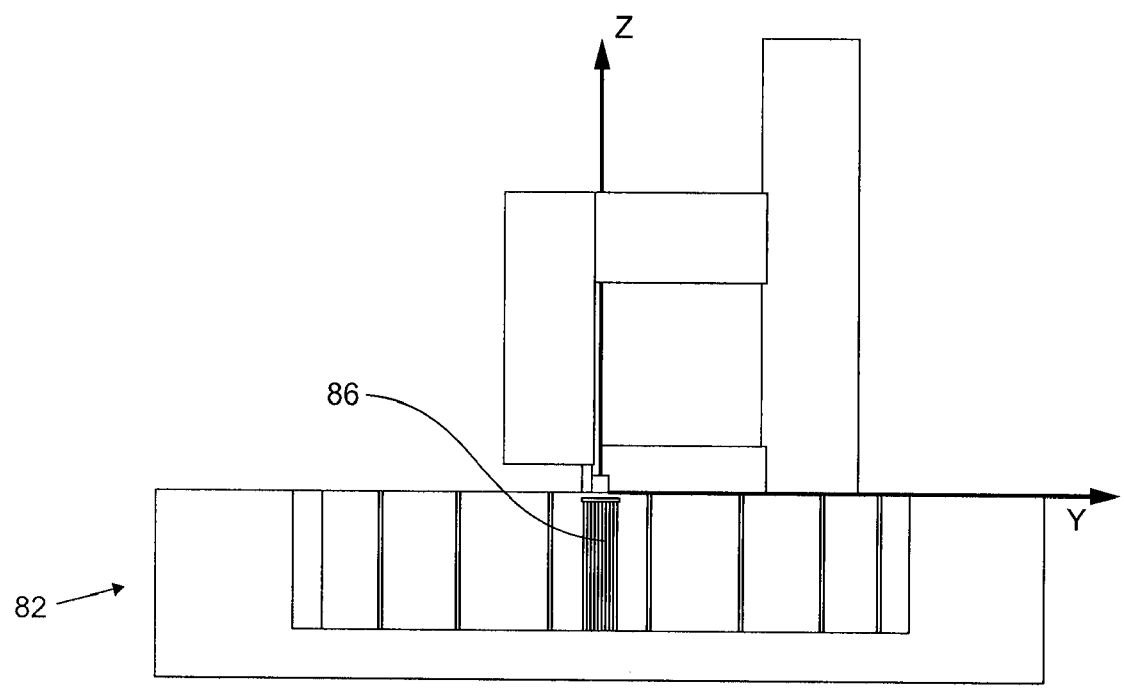
FIG. 20 is a translucent representation of the arrangement of FIG. 19 showing the arrangement of the pole within the sensor.
Figure 21:
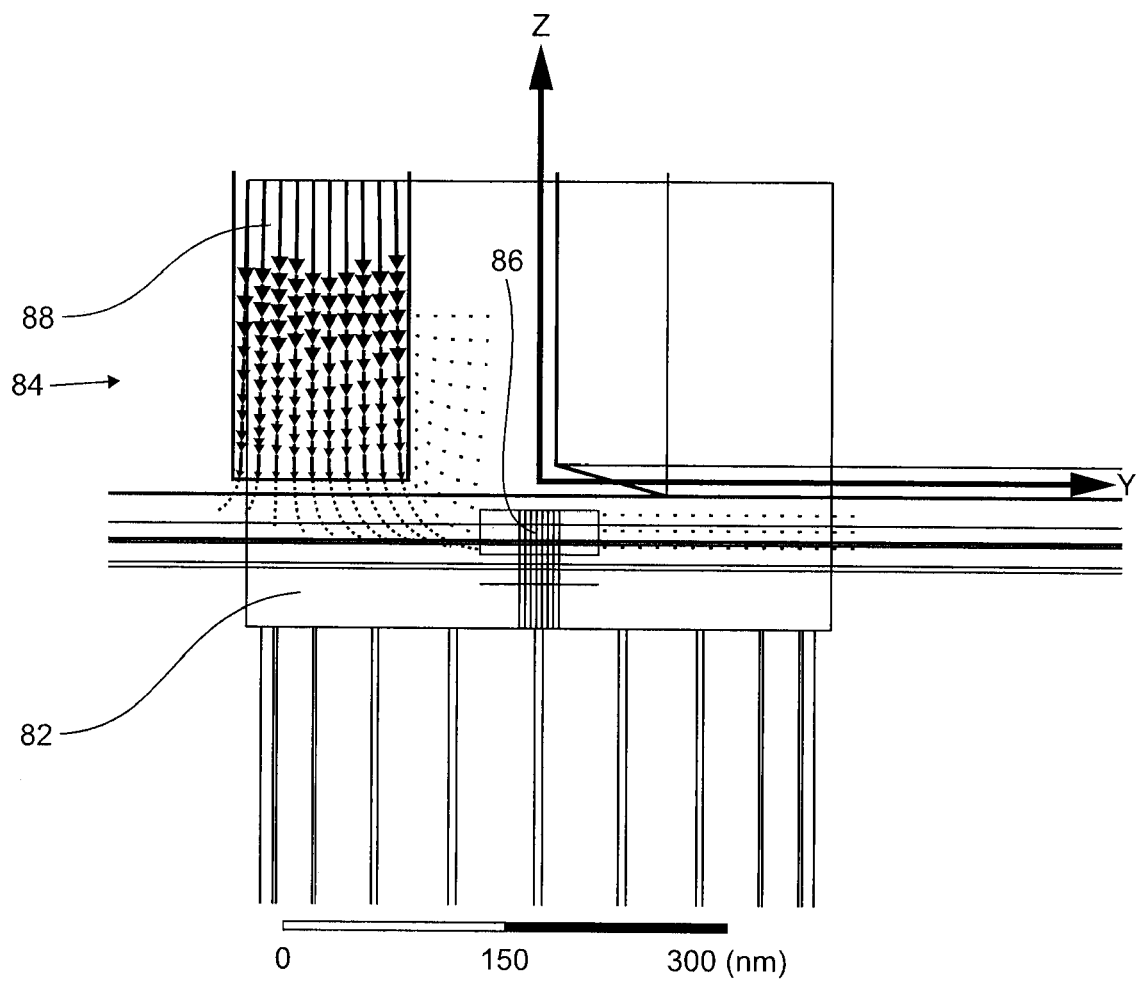
FIG. 21 shows a schematic representation of a sensor and head under test showing the typical configuration of magnetic field lines.

FIGS. 19 and 20 show schematic cross sections through a sensor 82. A head under test 84 is shown schematically. The pole 86 of the sensor is moved in two dimensions relative to the head under test 84, in the manner described above. Referring now to FIGS. 21 and 22A to D, the relationship between the sensor 82 and the head under test 84 can be seen more clearly. The magnetic field 88 flowing through the head under test and the sensor is shown schematically. In FIG. 21, the pole of the head 84 is not yet over the sensor centre pole 86. Thus, there is very little magnetic coupling between the magnetic field 88 flowing through the head and the sensor.

Figure 22A:
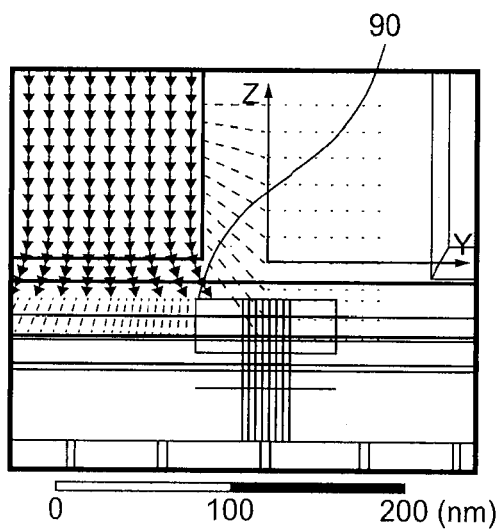
FIGS. 22a to 22d show various stages in the scan of a head under test with a sensor showing the changes in magnetic field lines as the sensor and head move relative to each other.
Figure 22B:
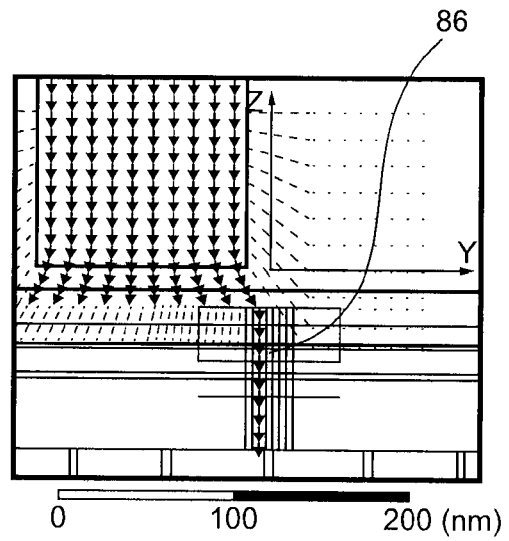
Figure 22C:
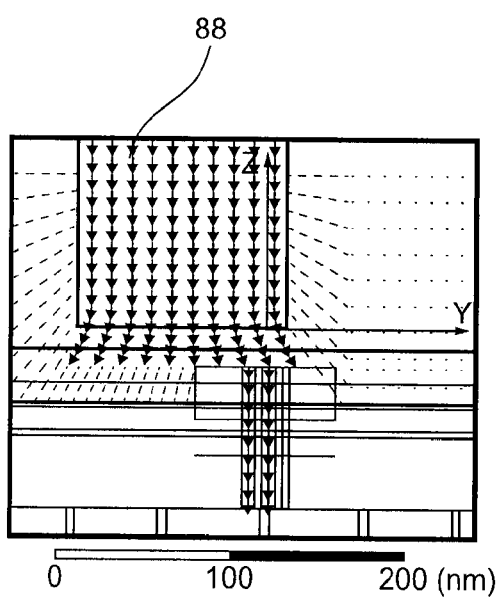
Figure 22D:
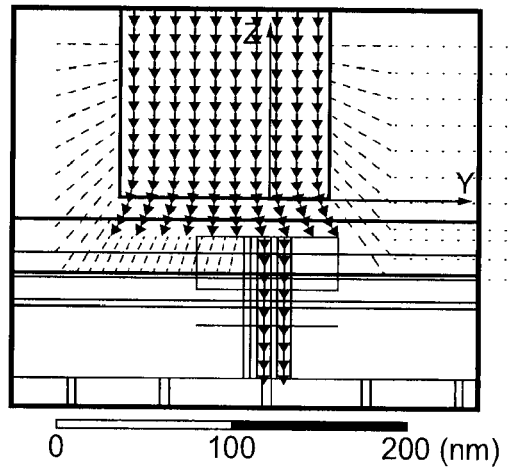

FIGS. 22A to 22D show the development of and changes in the magnetic circuit as the sensor 86 and its pole are moved relative to the head 84. Initially, in FIG. 22A, the pole tip 86 approaches the edge of the head under test 84. There is initial coupling in the region 90. As the pole tip 86 is moved (leftwards in the Figure) so as to engage magnetically more fully with the head 84, it can be seen that the coupling of the magnetic field 88 and the pole tip 86 increases. As the movement of the sensor 82 continues the region of the head 84 that is magnetically coupled with the pole tip 86 changes. Thus, in FIG. 22C the edge region of the pole tip 88 is engaged with the sensor 86. In FIG. 22D, a more central region of the magnetic field 88 generated by the pole tip 86 is coupled to the sensor pole.

Thus, by providing a pole tip that is smaller than the magnetic head under test, it is possible, extremely accurately, to determine the magnetic field distribution and shape of a head under test. Furthermore, by providing a sensor having a shield that is significantly larger than its pole, a large return path for magnetic field is provided which enables an increase in the magnetic coupling and sensitivity of the sensor.

FIG. 23 shows a two-dimensional plot as built up by the repeated scanning of a head by a sensor. In other words, in the examples of FIGS. 22A to 22D, this shows the single progression along one dimension. Typically, in a raster scan type manner or other two-dimensional scan configuration, a three-dimensional image of the magnetic field strength of the head 84 can be built up.

It will be appreciated, that it is important that the sensor has a flat active surface which, when brought into close proximity with a PMR head causes a magnetic circuit to be completed. Furthermore, due to the two-dimensional arrangement of the sensor, as shown in, for example, FIG. 18, the magnetic field coupling can extend in all directions on the two-dimensional plane of the sensor.

Embodiments of the present invention have been described with particular reference to the examples illustrated. However, it will be appreciated that variations and modifications may be made to the examples described within the scope of the present invention.

The invention claimed is:

1. A magnetic sensor for use in determining a map of a magnetic field or field sensitivity of recording heads having a write pole and a magnetic read element, the sensor comprising:
   a magnetic pole separate from a recording head's write pole; and
   a planar magnetic shield surrounding the magnetic pole, the magnetic shield configured to function as a return pole for a magnetic circuit formed with a recording head under test.

2. A magnetic sensor according to claim 1, in which the length and width of the shield are between $10^2$ and $10^3$ times larger than the corresponding dimensions of the magnetic pole.

3. A magnetic sensor according to claim 1, in which the magnetic pole has a width of between 10 and 100 nm and the shield has a width of between 10 to 50 micrometers.

4. A magnetic sensor according to claim 1, in which the shield is a 2 dimensional shape, with the pole being positioned centrally.

5. A magnetic sensor according to claim 1, in which the shield is square and has sides of length between 10 and 100 micrometers.

6. A magnetic sensor according to claim 1, in which the magnetic pole is configured so as to receive magnetic flux or direct generated magnetic flux in a direction perpendicular to the plane of the shield.

7. A magnetic sensor according to claim 1, in which the sensor has plural magnetic poles within a single shield.

8. A magnetic sensor according to claim 7, in which the magnetic poles are uniformly distributed within a central area of the shield.

9. A magnetic sensor according to claim 1, in which the shield is formed of the same material as the pole and as a unitary component with the magnetic pole.

10. A magnetic sensor according to claim 1, in which at least the one of the magnetic pole and shield is formed of a soft magnetic material.

11. A magnetic sensor according to claim 1, comprising a protective overcoat so as to protect the magnetic pole and the shield.

12. A magnetic sensor according to claim 1, comprising a coil arranged within the shield to generate a magnetic field at the magnetic pole.

13. A magnetic sensor according to claim 1, in which the shape of the end surface of the magnetic pole is a regular polygon.

14. A magnetic sensor according to claim 1, in which the shape of the end surface of the magnetic pole is an irregular polygon.

15. A magnetic sensor according to claim 1, in which the planar surface is treated to avoid sticking with a head under test.

16. A magnetic sensor according to claim 15, in which the treatment comprises one or more of the application of lubricant, the texturing and the use of a surface acoustic wave generator.

\* \* \* \* \*